US010375969B1

(12) United States Patent
Jones et al.

(10) Patent No.: US 10,375,969 B1
(45) Date of Patent: Aug. 13, 2019

(54) CONCUSSION STUNNER ROD AND NOSE

(71) Applicant: Jarvis Products Corporation, Middletown, CT (US)

(72) Inventors: Arthur Jones, Tabor, IA (US); Trent Jones, Tabor, IA (US)

(73) Assignee: JARVIS PRODUCTS CORPORATION, Middletown, CT (US)

( * ) Notice: Subject to any disclaimer, the term of this patent is extended or adjusted under 35 U.S.C. 154(b) by 0 days.

(21) Appl. No.: 16/275,998

(22) Filed: Feb. 14, 2019

Related U.S. Application Data

(60) Provisional application No. 62/643,804, filed on Mar. 16, 2018.

(51) Int. Cl.
*A22B 3/00* (2006.01)
*A22B 3/02* (2006.01)
*F15B 15/26* (2006.01)

(52) U.S. Cl.
CPC ............... *A22B 3/02* (2013.01); *F15B 15/26* (2013.01)

(58) Field of Classification Search
CPC .................................... A22B 3/00; A22B 3/02
USPC ............................................. 452/50, 57, 62
See application file for complete search history.

(56) References Cited

U.S. PATENT DOCUMENTS

| 3,632,032 | A | * | 1/1972 | Termet | A22B 3/02 206/3 |
| 3,755,949 | A | * | 9/1973 | Hancox | A22B 3/02 42/1.12 |
| 3,895,454 | A | * | 7/1975 | Hancox | A22B 3/02 42/1.12 |
| 4,219,905 | A | * | 9/1980 | Thacker | A22B 3/02 452/62 |
| 4,280,248 | A | * | 7/1981 | Herubel | A22B 3/02 124/40 |
| 4,503,585 | A | * | 3/1985 | Hamel | A22B 3/02 227/130 |
| 4,575,900 | A | * | 3/1986 | Hamel | A22B 3/02 227/130 |
| 4,631,779 | A | * | 12/1986 | Castiello | A22B 3/02 42/1.12 |

(Continued)

FOREIGN PATENT DOCUMENTS

WO 2019036459 A1 2/2019

*Primary Examiner* — Richard T Price, Jr.
(74) *Attorney, Agent, or Firm* — DeLio Peterson & Curcio LLC; Peter W. Peterson

(57) ABSTRACT

A stunning rod for a pneumatically operated animal concussion stunner comprises an elongated body. One end of the elongated body is adapted to receive a locking insert, and the other is adapted to engage a catch. The locking insert receives a locking element, wherein the combined locking insert and locking element are inserted into the first end of the elongated body. A strike end having a diameter larger than the diameter of the elongated body is secured to the first end of the rod via the locking insert and locking element. Locking grooves or protrusions disposed on the strike end interact with the locking insert to prevent rotation of the stunning rod and strike end during stunner operation. Lobes or flanges disposed about the periphery of the locking element interlock with grooves disposed within the rod first end, and further prevent rotation of the strike end during stunner operation.

54 Claims, 15 Drawing Sheets

(56) References Cited

U.S. PATENT DOCUMENTS

| | | | |
|---|---|---|---|
| 4,757,627 A * | 7/1988 | Saligari | A22B 3/02 42/1.12 |
| 5,692,951 A * | 12/1997 | Huff | A22B 3/02 452/57 |
| 6,135,871 A | 10/2000 | Jones | |
| 9,661,859 B1 | 5/2017 | Jones et al. | |
| 2004/0209562 A1 | 10/2004 | Jones | |

\* cited by examiner

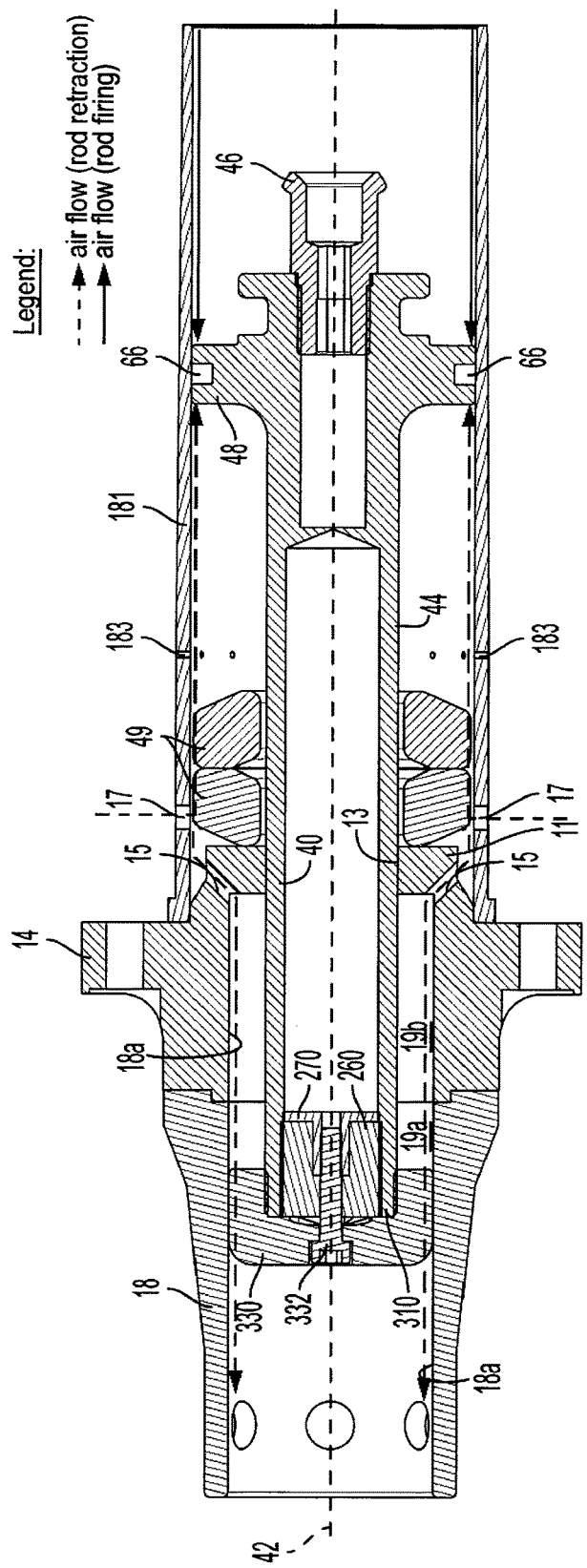

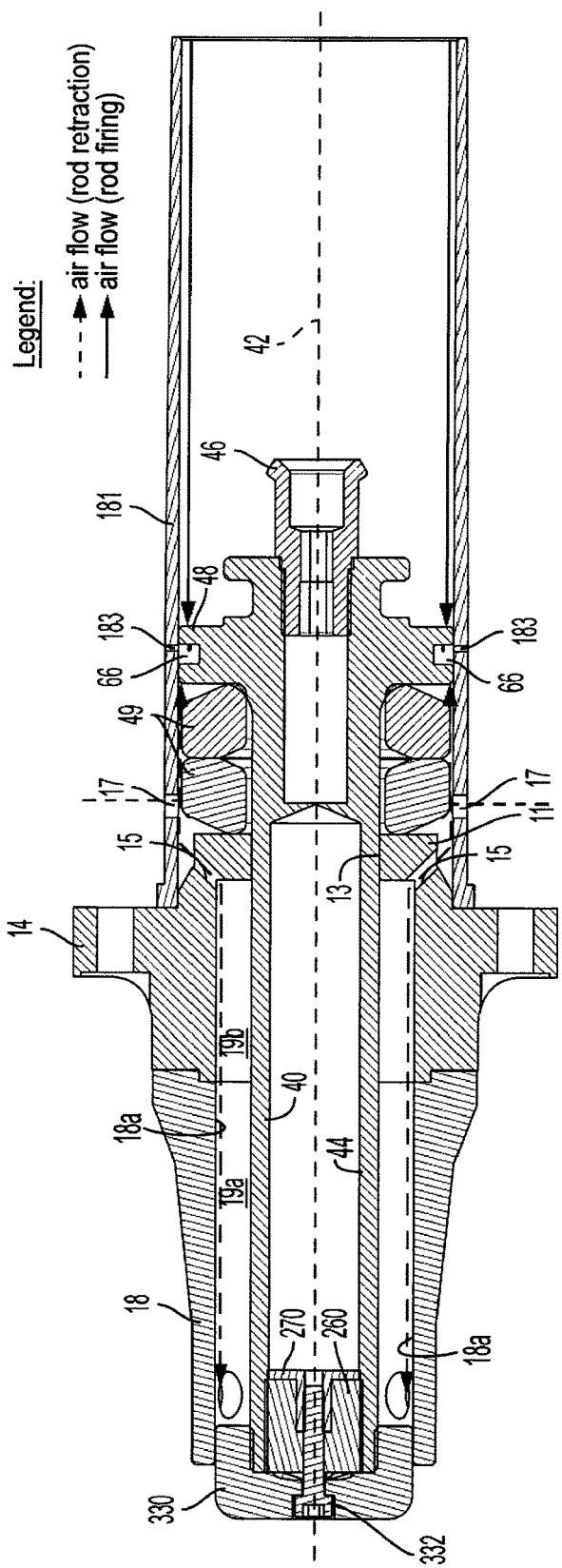

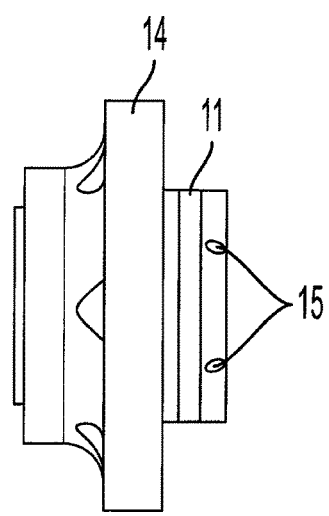
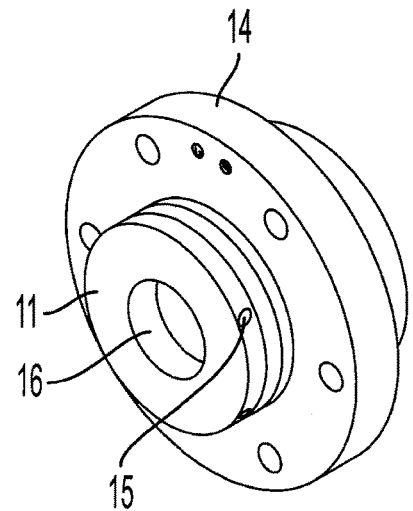
FIG. 33
FIG. 34
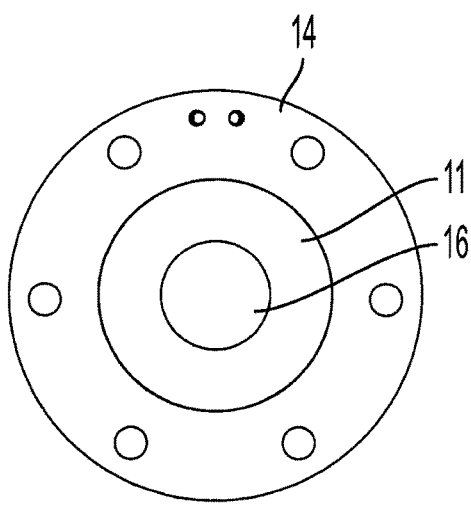
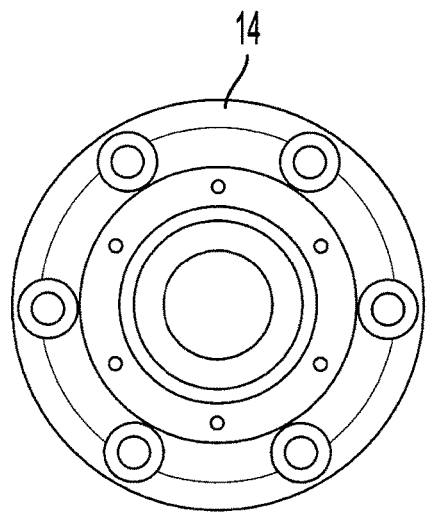
FIG. 35
FIG. 36

CONCUSSION STUNNER ROD AND NOSE

BACKGROUND OF THE INVENTION

1. Field of the Invention

This invention relates in general to a pneumatic animal stunner for use in livestock/slaughterhouse operations and more specifically to the animal stunner rod and nose.

2. Description of Related Art

In livestock production plants, it is important to stun and disable an animal for processing. Although numerous methods have been used to stun livestock, captive bolt mechanisms have proven to be the most efficient, inexpensive, and humane way to disable the animal. Particularly, pneumatic captive bolt devices have been used in this capacity.

U.S. Pat. No. 6,135,871 and U.S. Patent Publication No. 2004/0209562, the disclosures of which are hereby incorporated by reference, disclose pneumatic animal stunners that, among other things, include a physical catch for the piston that drives the stunning rod.

FIGS. 1 and 2 show a prior art catch arrangement for a stunner in which stunning rod 1 extending rightward (forward) from a piston 2 has a leftward (rearward) end with outwardly extending lips 3 that may be alternately held and released by inward extending lips at the end portion 4a of a catch 4. At a central portion of the body of catch 4 is an inwardly extending flange 4b which is pivotable about an outwardly extending flange 6a of catch pivot post 6. A catch piston 5 includes an inner bore 5a at a forward end, an inner bore 5c at a rearward end, and a relief portion 5b between the two. In the hold position of FIG. 1, the catch piston 5 is slid longitudinally rearward so that forward inner bore 5a contacts moves catch forward end 4a toward and into engagement with stunning rod lips 3, at the same time that rearward inner bore 5c contacts the outer surface of catch rearward end 4c. In the release position of FIG. 2, the catch piston 5 is slid longitudinally forward so that forward inner bore 5a moves forward of catch forward end 4a, and the relief portion 5b permits catch forward end 4a to move outward and out of engagement with stunning rod lips 3 as the flange 4b of catch 4 pivots about catch post pivot flange 6a. At the same time, catch piston rearward inner bore 5c slides forward and then moves out of contact with the outer surface of catch rearward end 4c. Upon release of the stunning rod lips, compressed air behind piston 2 moves stunning rod 1 forward to stun the animal.

FIG. 3 shows a prior art concussion stunner in which a housing 10 has a cylinder 12 located inside the housing and a piston 14 that slides within the cylinder. The piston is integrally formed with a stunning rod 16 having a catch end 18 and an impact head 20. A first trigger 22 controls a valve system 24 to supply pressurized fluid to a pressure chamber formed inside the housing. The pressure chamber comprises the regions indicated with reference numbers 26 and 28 which surround the exterior of cylinder 12, and interior region 32 located behind piston 14. Compressed air moves freely from regions 26 and 28 through openings 30 and into the region 32 behind piston 14 to apply pressure to the back side of the piston, which urges it (and consequently stunning rod 16) towards the front of the stunner. The stunning rod 16 and impact head 20 share the same diameter throughout their respective lengths. The remaining salient features presented in prior art FIG. 3 are described in further detail in U.S. Pat. Pub. No. 2004/0209562.

The catch and other components of such prior designs function well, but in operation some of its components are subject to sliding engagement with other components, and therefore interference and/or wear, which causes drag and/or requires periodic replacement of such components. One particular component of the stunner that requires periodic replacement is the annular cushion(s) that surrounds the stunning rod inside the stunner housing. The stunning rod itself is subject to rotation during operation, which further contributes to undesirable wear and tear. The stunning rod of such prior concussion designs is further subject to debris buildup during usage, and such debris buildup is hard to remove due to the configurations of the prior art stunner nose and stunning rod.

SUMMARY OF THE INVENTION

Bearing in mind the problems and deficiencies of the prior art, it is therefore an object of the present invention to provide an animal stunner stunning rod that allows for clearance of debris which build up in the stunner housing.

It is still another object of the present invention to provide a stunning rod that has a more secure attachment of the strike end.

It is yet another object of the present invention to provide a stunning rod and strike end connection which prevents rotation of the strike end with respect to the rod during operation of the stunner.

Yet another object of the present invention is to provide an animal stunner in which the stunning rod slides easily and reliably without rotation of the strike end.

Still other objects and advantages of the invention will in part be obvious and will in part be apparent from the specification.

The above and other objects, which will be apparent to those skilled in the art, are achieved in the present invention which is directed to a stunning rod adapted for use in a pneumatic animal stunner for stunning an animal, the rod being mountable with a piston movable within an inner chamber in the stunner, the inner chamber having a catch for alternately holding and releasing the stunning rod, the rod comprising: an elongated body having a longitudinal axis and a diameter, the elongated body having a forward end and an opposite rearward end, the forward end having an opening therein adapted to receive a locking insert, and the opposite rearward end adapted to engage a catch; a strike end having a diameter larger than the elongated body diameter, the strike end adapted for striking an animal's head; and a locking insert secured to the strike end and disposed in the elongated body forward end opening, the locking insert having a longitudinal axis substantially parallel to the elongated body longitudinal axis, the locking insert conforming to the inside of the elongated body forward end opening, wherein the stunning rod is capable of being driven forward along a longitudinal axis within the stunner inner chamber to stun an animal, and rearward along the longitudinal axis to retract and hold the stunning rod by the catch.

In an embodiment, the stunning rod may further include a locking element and central projection extending therefrom, wherein the locking insert has a bore at an end opposite the strike end for receiving the central projection of the locking element. The locking element may have at least one lobe disposed about its periphery and the elongated body forward end opening may include at least one groove for receiving the at least one lobe of the locking element. The locking element central projection may further comprise an outer diameter corresponding to an inner diameter of the locking insert bore. The strike end may further comprise a bore for receiving a fastener for securing the strike end to the locking element, the fastener extending through the strike end, locking insert, and locking element. The locking insert may be resilient, and is under compression as secured to the strike end and inserted into the elongated body forward end opening. The strike end may further include at least one groove or projection, and when secured, the compressed locking insert may expand outwardly into the strike end at least one groove or projection to secure the strike end in the elongated body forward end against rotation.

In another aspect, the present invention is directed to a pneumatic animal stunner for stunning an animal, the stunner comprising: a housing; an inner chamber in the housing; a catch mounted within the housing for alternately holding and releasing a stunning rod; and a stunning rod moveable within the inner chamber in the stunner, the stunning rod comprising: an elongated body having a longitudinal axis and a diameter, the elongated body having a forward end and an opposite rearward end, the forward end having an opening therein adapted to receive a locking insert, and the opposite rearward end adapted to engage the catch; a strike end having a diameter larger than the elongated body diameter, the strike end adapted for striking an animal's head; and a locking insert secured to the strike end and disposed in the elongated body forward end opening, the locking insert having a longitudinal axis substantially parallel to the elongated body longitudinal axis, the locking insert conforming to the inside of the elongated body forward end opening, wherein the stunning rod is capable of being driven forward along a longitudinal axis within the stunner inner chamber to stun an animal, and rearward along the longitudinal axis to retract and hold the stunning rod by the catch.

In an embodiment, the stunning rod may further include a locking element and central projection extending therefrom, and the locking insert may have a bore at an end opposite the strike end for receiving the central projection of the locking element. The locking element may have at least one lobe disposed about its periphery and the elongated body forward end opening may include at least one groove for receiving the at least one lobe of the locking element. The locking element central projection may further comprise an outer diameter corresponding to an inner diameter of the locking insert bore. The strike end may further comprise a bore for receiving a fastener for securing the strike end to the locking element, the fastener extending through the strike end, locking insert, and locking element. The locking insert may be resilient and is under compression as secured to the strike end and inserted into the elongated body forward end opening. The strike end may further include at least one groove or projection, and when secured, the compressed locking insert may expand outwardly into the strike end at least one groove or projection to secure the strike end in the elongated body forward end against rotation.

In yet a further aspect, the present invention is directed to a stunning rod adapted for use in a pneumatic animal stunner for stunning an animal, the rod being mountable with a piston movable within an inner chamber in the stunner, the inner chamber having a catch for alternately holding and releasing the stunning rod, the rod comprising: an elongated body having a longitudinal axis and a diameter, the elongated body having a forward end and an opposite rearward end, the forward end having an opening therein and at least one groove disposed within an inner surface thereof, and the opposite rearward end adapted to engage a catch; a strike end having a diameter larger than the elongated body diameter, the strike end adapted for striking an animal's head; a locking element having a surface, the locking element surface having at least one lobe disposed about its periphery received in the at least one groove of the elongated body forward end opening; and a locking insert secured within the elongated body forward end opening by the locking element, wherein the stunning rod is capable of being driven forward along a longitudinal axis within the stunner inner chamber to stun an animal, and rearward along the longitudinal axis to retract and hold the stunning rod by the catch.

In an embodiment, the locking element surface may extend in a direction normal to the elongated body longitudinal axis. The locking insert may further comprise a bore and the locking element may have a central projection with an outer diameter corresponding to an inner diameter of the locking insert bore. The strike end may further comprise a bore for receiving a fastener for securing the strike end to the locking element, the fastener extending through the strike end, locking insert, and locking element central projection. The locking insert may be resilient and as secured is under compression. The strike end may further include at least one groove or projection, and when secured, the compressed locking insert may expand outwardly into the strike end at least one groove or projection to secure the strike end in the elongated body forward end against rotation. The locking insert may conform to the inside of the elongated body forward end opening.

In still another aspect, the present invention is directed to a pneumatic animal stunner for stunning an animal, the stunner comprising: a housing; an inner chamber in the housing; a catch mounted within the housing for alternately holding and releasing a stunning rod; and a stunning rod moveable within the inner chamber in the stunner, the stunning rod comprising: an elongated body having a longitudinal axis and a diameter, the elongated body having a forward end and an opposite rearward end, the forward end having an opening therein and at least one groove disposed within an inner surface thereof, and the opposite rearward end adapted to engage the catch; a strike end having a diameter larger than the elongated body diameter, the strike end adapted for striking an animal's head; a locking element having a surface, the locking element surface having at least one lobe disposed about its periphery received in the at least one groove of the elongated body forward end opening; and a locking insert secured within the elongated body forward end opening by the locking element, wherein the stunning rod is capable of being driven forward along a longitudinal axis within the stunner inner chamber to stun an animal, and rearward along the longitudinal axis to retract and hold the stunning rod by the catch.

In an embodiment, the locking element surface may extend in a direction normal to the elongated body longitudinal axis. The locking insert may further comprise a bore and the locking element may have a central projection with an outer diameter corresponding to an inner diameter of the locking insert bore. The strike end may further comprise a bore for receiving a fastener for securing the strike end to the locking element, the fastener extending through the strike end, locking insert, and locking element central projection. The locking insert may be resilient and as secured is under compression. The strike end may further include at least one groove or projection, and when secured, the compressed locking insert is expanded outwardly into the strike end at least one groove or projection to secure the strike end in the elongated body forward end against rotation. The locking insert may conform to the inside of the elongated body forward end opening.

In yet another aspect, the present invention is directed to a stunning rod adapted for use in a pneumatic animal stunner for stunning an animal, the rod being mountable with a piston movable within an inner chamber in the stunner, the inner chamber having a catch for alternately holding and releasing the stunning rod, the rod comprising: an elongated body having a longitudinal axis and a diameter, the elongated body having a forward end and an opposite rearward end, the forward end having an opening adapted to receive a locking insert, and the opposite rearward end adapted to engage a catch; a strike end having a diameter larger than the elongated body diameter, the strike end having a first surface adapted for striking an animal's head and a second surface having at least one groove or projection opposite the first surface; and a locking insert secured to the strike end second surface and secured within the elongated body forward end opening, the locking insert conforming to the inside of the elongated body forward end opening and the strike end at least one groove or projection, wherein the stunning rod is capable of being driven forward along a longitudinal axis within the stunner inner chamber to stun an animal, and rearward along the longitudinal axis to retract and hold the stunning rod by the catch.

In an embodiment, the locking insert may be resilient and is under compression as secured to the strike end and inserted into the elongated body forward end opening. A locking element having a central projection extending therefrom may be further included, and the locking insert may have a bore at an end opposite the strike end for receiving the central projection of the locking element. The locking element may have at least one lobe disposed about its periphery and the elongated body forward end opening may include at least one groove for receiving the at least one lobe of the locking element. The locking element central projection may further comprise an outer diameter corresponding to an inner diameter of the locking insert bore. The strike end may further comprise a bore for receiving a fastener for securing the strike end to the locking element, the fastener extending through the strike end, locking insert, and locking element. As secured, the compressed locking insert may expand outwardly into the strike end at least one groove or projection to secure the strike end in the elongated body forward end against rotation.

In a further aspect, the present invention is directed to a pneumatic animal stunner for stunning an animal, the stunner comprising: a housing; an inner chamber in the housing; a catch mounted within the housing for alternately holding and releasing a stunning rod; and a stunning rod movable within the inner chamber in the stunner, the stunning rod comprising: an elongated body having a longitudinal axis and a diameter, the elongated body having a forward end and an opposite rearward end, the forward end having an opening adapted to receive a locking insert, and the opposite rearward end adapted to engage a catch; a strike end having a diameter larger than the elongated body diameter, the strike end having a first surface adapted for striking an animal's head and a second surface having at least one groove or projections opposite the first surface; and a locking insert secured to the strike end second surface and secured within the elongated body forward end opening, the locking insert conforming to the inside of the elongated body forward end opening and the strike end at least one groove or projection, wherein the stunning rod is capable of being driven forward along a longitudinal axis within the stunner inner chamber to stun an animal, and rearward along the longitudinal axis to retract and hold the stunning rod by the catch.

In an embodiment, the locking insert may be resilient and is under compression as secured to the strike end and inserted into the elongated body forward end opening. The stunning rod may further include a locking element and central projection extending therefrom, and the locking insert may have a bore at an end opposite the strike end for receiving the central projection of the locking element. The locking element may have at least one lobe disposed about its periphery and the elongated body forward end opening may include at least one groove for receiving the at least one lobe of the locking element. The locking element central projection may further comprise an outer diameter corresponding to an inner diameter of the locking insert bore. The strike end may further comprise a bore for receiving a fastener for securing the strike end to the locking element, the fastener extending through the strike end, locking insert, and locking element. As secured, the compressed locking insert may expand outwardly into the strike end at least one groove or projection to secure the strike end in the elongated body forward end against rotation.

In still a further aspect, the present invention is directed to a pneumatic animal stunner for stunning an animal, the stunner comprising: a housing; an inner chamber in the housing; a catch mounted within the housing for alternately holding and releasing a stunning rod; and a stunning rod movable within the inner chamber in the stunner, the stunning rod comprising: an elongated body having a longitudinal axis and an outer diameter, the elongated body having a forward end and an opposite rearward end, the opposite rearward end adapted to engage a catch; and a strike end secured to the elongated body forward end having an outer diameter larger than the elongated body diameter and grooves, the strike end adapted for striking an animal's head; and a nose, including a head contact at a forward end of the housing, the nose and head contact having a sleeve with an opening having an inner diameter for receiving the strike end in a sliding fit, wherein the stunning rod is capable of being driven forward along a longitudinal axis within the stunner inner chamber to stun an animal with the strike end, and rearward along the longitudinal axis to retract and hold the stunning rod by the catch; and wherein when the stunning rod strike end is fully driven forward past the head contact there is an annular gap between the stunning rod elongated body and the sleeve of the nose and head contact.

In an embodiment, the nose may have at least one opening rearward of the head contact for the passage of fluid as the strike end slides in the sleeve back to the retracted position. A liner may be disposed within the inner chamber in the housing and surrounding the stunning rod, the liner having at least one liner hole rearward of the nose for the passage of fluid entering through the liner hole and further flowing through the at least one opening of the nose as the strike end slides in the sleeve back to the retracted position.

In another aspect, the present invention is directed to a method of using a stunning rod in a pneumatic animal stunner for stunning an animal, the stunner having an inner chamber and a catch for alternately holding and releasing the stunning rod, comprising: providing a stunner having a housing, an inner chamber, and a catch mounted within the housing for alternately holding and releasing a stunning rod; providing a stunning rod with an elongated body having a longitudinal axis and a diameter, the elongated body having a forward end and an opposite rearward end, the forward end having an opening therein adapted to receive a locking insert and at least one groove disposed within the opening, and the opposite rearward end adapted to engage the catch; providing on the stunning rod a piston moveable within an inner chamber of the stunner housing; providing a strike end having a diameter larger than the elongated body diameter, the strike end adapted for striking an animal's head; providing on the stunner housing a nose having a sleeve with an opening, the sleeve opening having an inner diameter for receiving the strike end in a sliding fit; mounting the stunning rod and piston in the stunner inner chamber, with the stunning rod extending through the sleeve of the nose; supplying a pressurized fluid to a rearward end of the inner chamber to move the piston forward; sliding the rod along the longitudinal axis within the inner chamber through the sleeve of the housing nose to drive the stunning rod forward to stun an animal, wherein when the stunning rod is fully driven forward past the sleeve there is an annular gap between the stunning rod elongated body and the nose; retracting the stunning rod rearward along the longitudinal axis; and holding the stunning rod within the inner chamber by engagement of the catch with the outwardly extending lip at rearward end of the rod.

In an embodiment, the method may further provide a locking insert secured to the strike end and disposed in the elongated body forward end opening, the locking insert having a longitudinal axis substantially parallel to the elongated body longitudinal axis, the locking insert conforming to the inside of the elongated body forward end opening. The method may further provide a locking element and central projection extending therefrom, and wherein the locking insert has a bore at an end opposite the strike end for receiving the central projection of the locking element. The strike end may further comprise a bore for receiving a fastener for securing the strike end to the locking element, the fastener extending through the strike end, locking insert, and locking element. The locking insert may be resilient and is under compression as secured to the strike end and inserted into the elongated body forward end opening. The nose may further comprise a head contact at a forward end of the housing, the nose having at least one opening rearward of the head contact for the passage of fluid and debris as the stunning rod retracts rearward along the longitudinal axis. A liner may be disposed within the inner chamber in the housing and surrounding the stunning rod, the liner having at least one liner hole disposed rearward of the nose; and wherein the fluid and debris passing through the at least one opening of the nose further pass through the at least one opening of the liner as the stunning rod retracts rearward along the longitudinal axis.

Yet another aspect of the present invention is directed to a method of assembling a stunning rod for use in a pneumatic animal stunner for stunning an animal, comprising: providing a stunning rod with an elongated body having a longitudinal axis and a diameter, the elongated body having a forward end and an opposite rearward end, the forward end having an opening therein and at least one groove disposed within its inner surface, and the opposite rearward end adapted to engage a catch; providing a strike end having a diameter larger than the elongated body diameter, the strike end having a first surface adapted for striking an animal's head and a second surface having at least one groove or projection opposite the first surface; providing a locking insert having a longitudinal axis substantially parallel to the elongated body longitudinal axis and a bore disposed along said longitudinal axis, the locking insert conforming to the inside of the elongated body forward end upon insertion; providing a locking element having a central projection with a bore and a surface, the locking element surface having at least one lobe disposed about its periphery for reception by the at least one groove of the elongated body forward end opening; inserting the locking element central projection into the locking insert bore; inserting the combined locking element and locking insert into the elongated body forward end, the at least one groove of the elongated body forward end opening receiving the at least one lobe of the locking element; and mounting the strike end to the stunning rod elongated body forward end.

In an embodiment, the method may further include: providing a bore disposed along a central axis of the strike end; and inserting a fastener through the bores of the strike end and locking insert to secure the strike end to the elongated body forward end. The method may further include compressing the locking insert upon inserting the locking insert into the elongated body forward end and securing the locking insert to the strike end. The method may further include expanding out the compressed locking insert into the strike end at least one groove or projection, securing the strike end into the elongated body forward end. The method may further include providing in the stunning rod forward end opening at least one groove disposed within an inner surface thereof, and expanding out the compressed locking insert into the at least one groove of the elongated body forward end opening. The method may further include providing in the stunning rod forward end at least one groove disposed within an inner surface thereof; providing a locking element having a central projection with a bore and a surface, the locking element surface having at least one lobe disposed about its periphery for reception by the at least one groove of the elongated body forward end opening; inserting the locking element central projection into the locking insert bore; insert the combined locking element and locking insert into the elongated body forward end, the at least one groove of the elongated body forward end opening receiving the at least one lobe of the locking element; and mounting the strike end to the stunning rod elongated body forward end.

In still a further aspect, the present invention is directed to a method of using a stunning rod in a pneumatic animal stunner for stunning an animal, the stunner having an inner chamber and a catch for alternately holding and releasing the stunning rod, comprising: providing a stunner having a housing, an inner chamber, and a catch for alternately holding and releasing a stunning rod; providing a stunning rod moveable within the inner chamber with an elongated body having a longitudinal axis and a diameter, the elongated body having a forward end and an opposite rearward end, the opposite rearward end adapted to engage the catch; providing a strike end secured to the elongated body forward end having a diameter larger than the elongated body diameter, the strike end adapted for striking an animal's head; providing on the stunner housing a nose, including a head contact at a forward end of the housing, the nose and head contact having a sleeve with an opening having an inner diameter for receiving the strike end in a sliding fit; supplying a pressurized fluid to a rearward end of the inner chamber to move the piston forward; driving the stunning rod forward along a longitudinal axis within the stunner inner chamber to stun an animal with the strike end, and rearward along the longitudinal axis to retract and hold the stunning rod by the catch, wherein when the stunning rod strike end is fully driven forward past the head contact, there is an annular gap between the stunning rod elongated body and the sleeve of the nose and head contact.

In an embodiment, the nose may have at least one opening rearward of the head contact, and may further include passing fluid through the at least one nose rearward opening as the strike end slides in the sleeve back to the retracted position. A liner may further be provided within the inner chamber in the housing surrounding the stunning rod, the liner having at least one liner hole rearward of the nose, and further including passing fluid through the liner hole and further flowing the fluid through the at least one nose rearward opening as the strike end slides in the sleeve back to the retracted position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 9 is a side cross-sectional exaggerated view of the animal stunner configuration of FIG. 8 with the rod in the partially extended position.

FIG. 10 is a side cross-sectional exaggerated view of the animal stunner configuration of FIG. 8 with the rod in the fully extended position.

FIG. 33 is a side view of the nose of the stunner of the present invention.

FIG. 34 is a perspective view of the nose of FIG. 33.

FIG. 35 is a rear view of the nose of FIG. 33.

FIG. 36 is a frontal view of the nose of FIG. 33.

DESCRIPTION OF EMBODIMENT(S)

Figure 1:
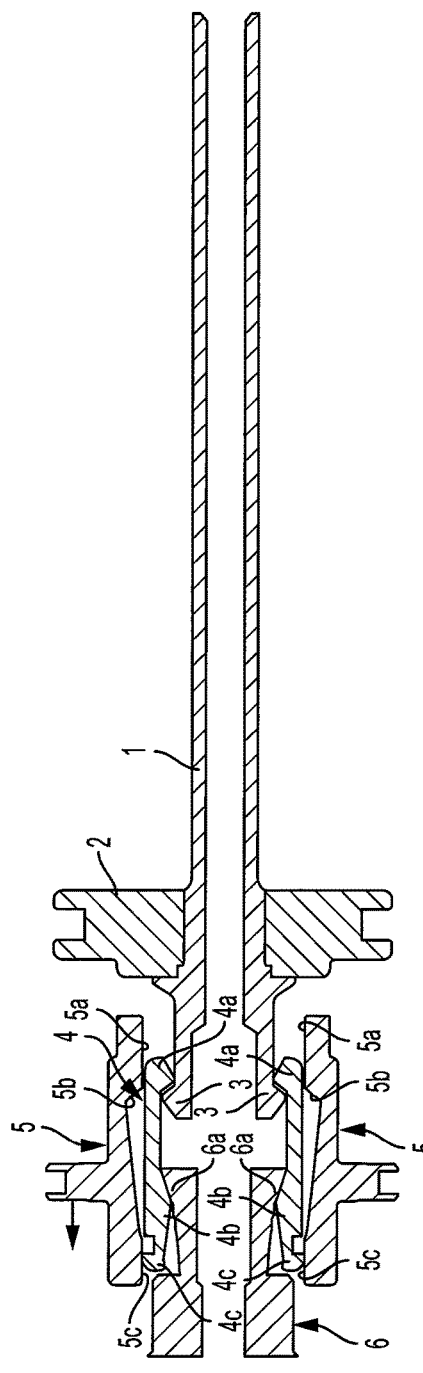
FIG. 1 is a cross sectional view of a prior art stunner catch system in a hold position.
Figure 2:
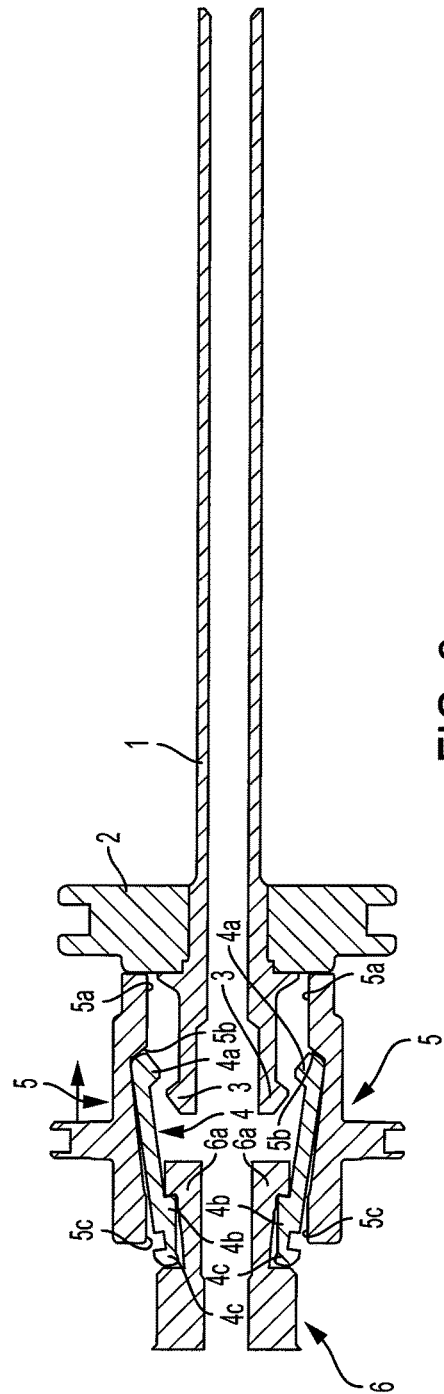
FIG. 2 is a cross sectional view of the prior art stunner catch system of FIG. 1 in a release position.
Figure 3:
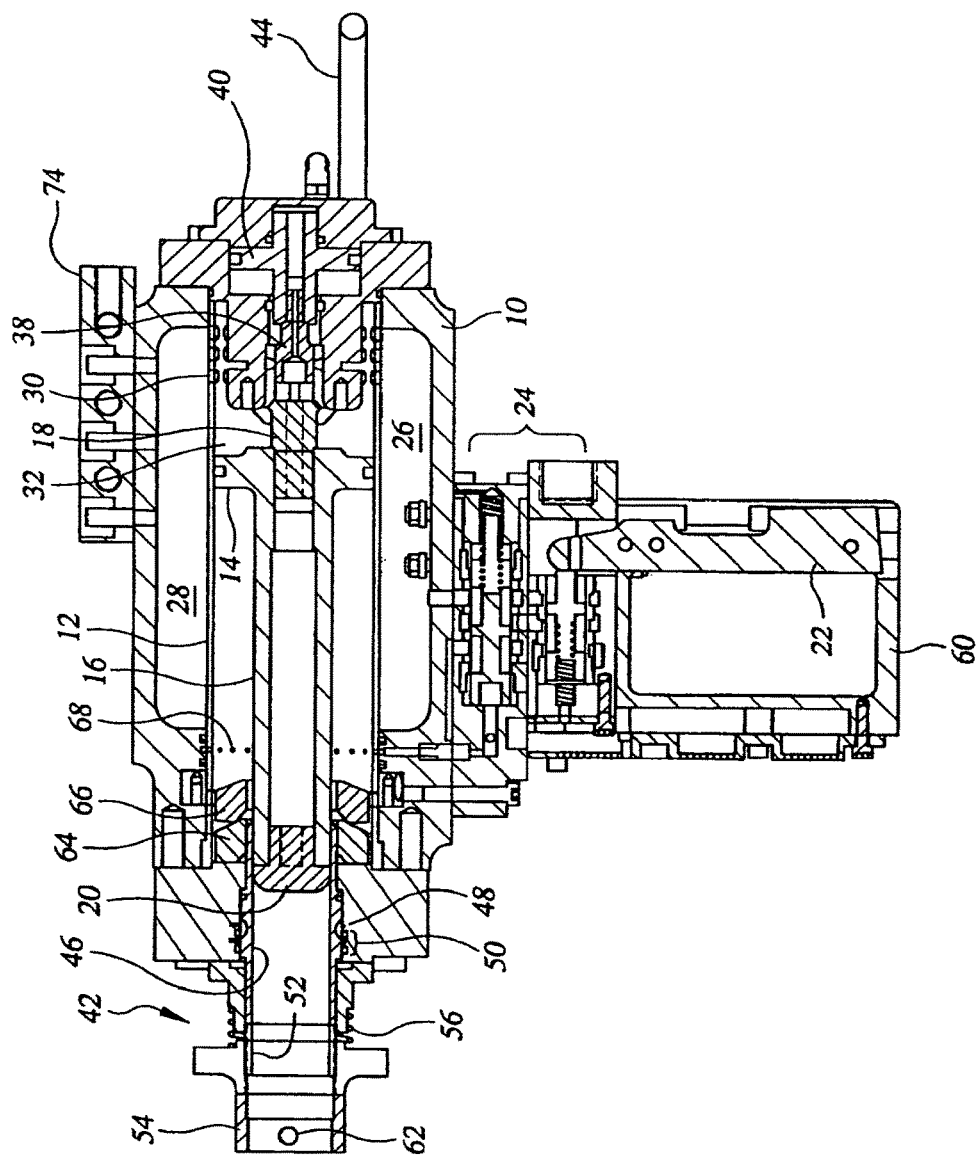
FIG. 3 is a side cross sectional view of a prior art concussion stunner.

In describing the embodiment(s) of the present invention, reference will be made herein to FIGS. 1-37 of the drawings in which like numerals refer to like features of the invention.

Structure of the exemplary animal stunner 10 is shown in general in FIGS. 4-7. The stunner 10 includes an outer elongated hollow housing 12, an outer housing nose or front end 14, a tail end 16, a stunning rod 40 and a catch 20 for holding and releasing the stunning rod 40. The portion of the animal stunner 10 having a catch is shown in detail in FIG. 4. The forward and rearward directions described herein are with respect to the stunner front end 14, and inward and outward directions described herein are with respect to a longitudinal axis 42. A piston 48 surrounded by an O-ring seal 66 slides within an inner cylindrical chamber 180 forward and rearward along axis 42, and carries stunning rod 40. The rearward end of stunning rod 40 ends in an outward extending lip 46 that is alternately held and released by catch 20, and the forward end of the stunning rod extends through head contact 18 to be driven toward the animal's head when the catch releases the stunning rod lip 46.

Figure 4:
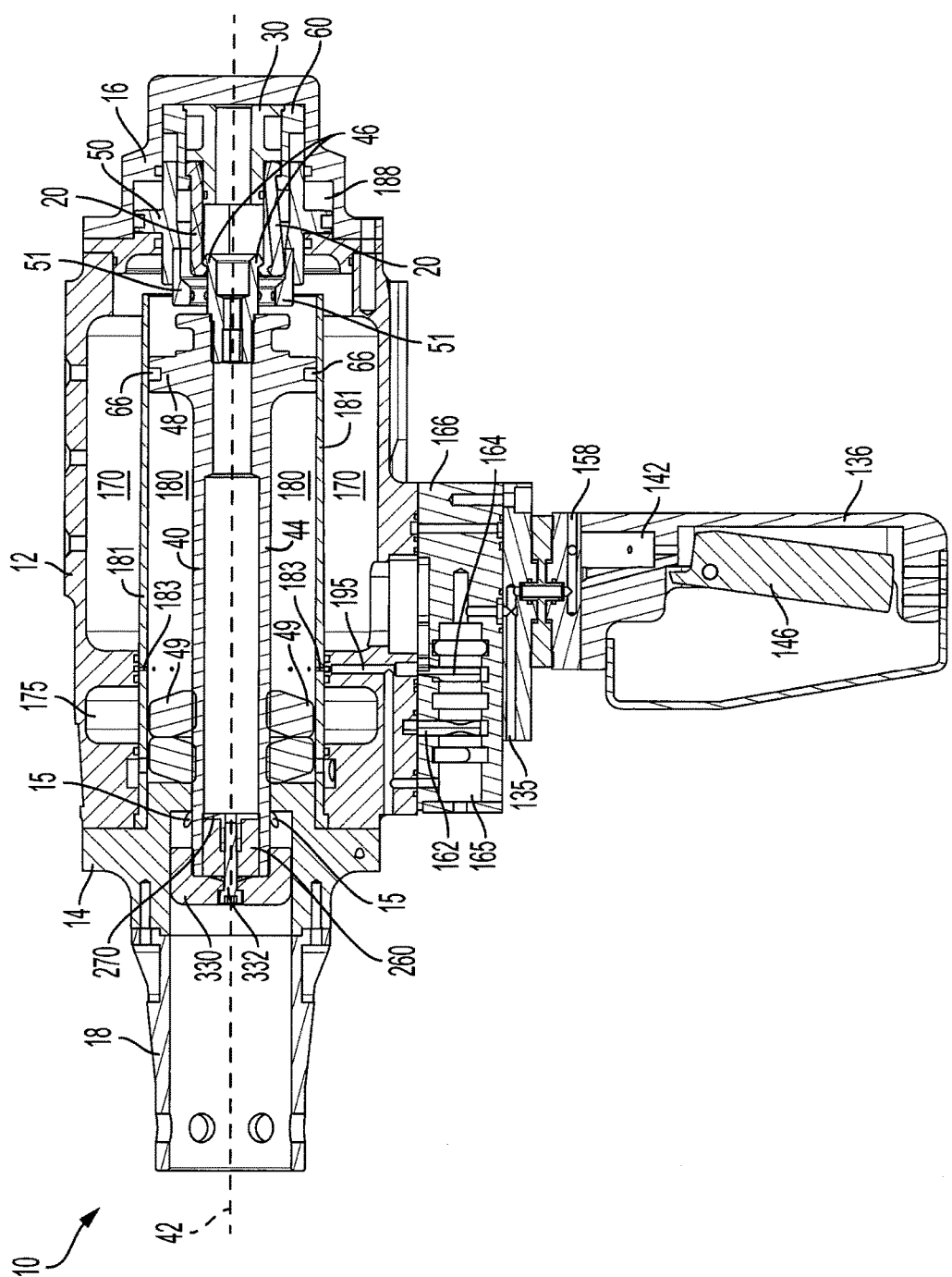
FIG. 4 is a side cross-sectional view of an animal stunner with the top half of the catch in the hold position (the bottom half of the catch in the released position for exemplary purposes only), with valves in neutral position, with the air supply pressurized and prior to firing, according to the present invention.
Figure 5:
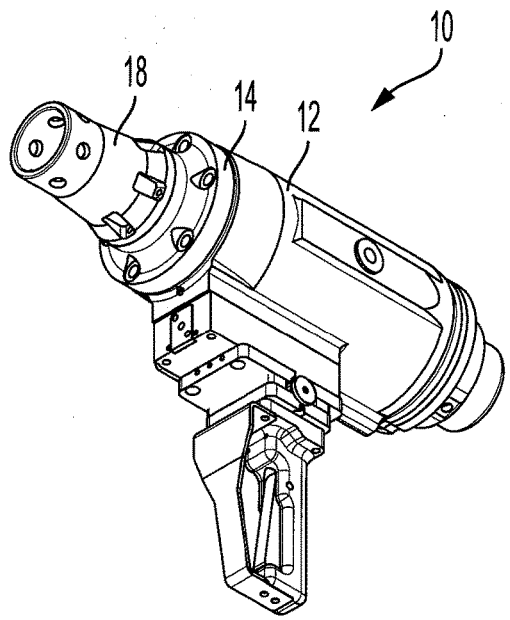
FIG. 5 is a front perspective view of the animal stunner of FIG. 4 of the present invention.
Figure 6:
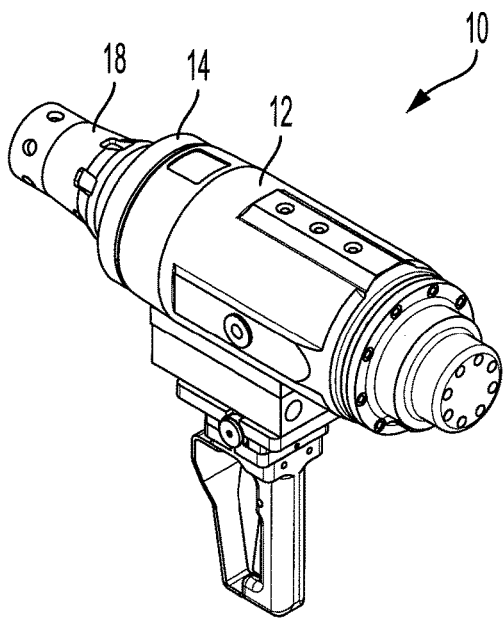
FIG. 6 is a rear perspective view of the animal stunner of FIG. 4 of the present invention.
Figure 7:
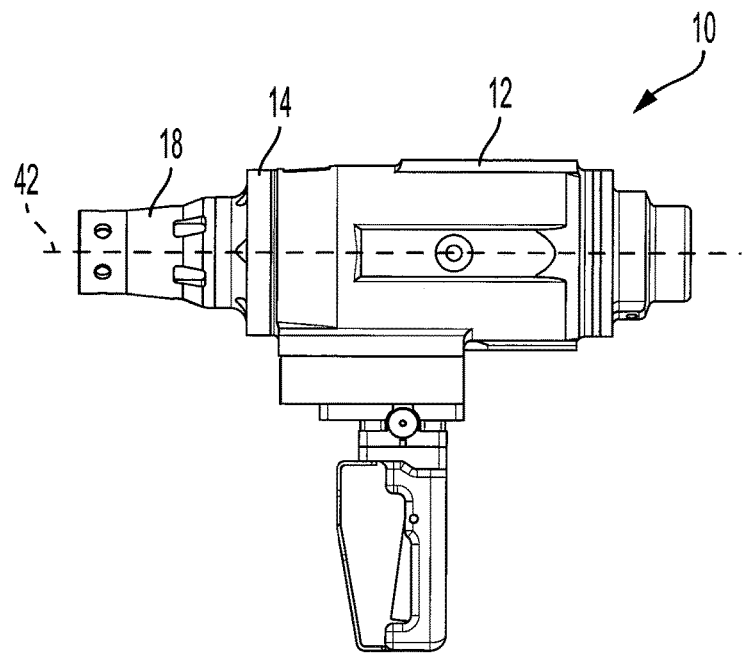
FIG. 7 is a side view of the animal stunner of FIG. 4 of the present invention.
Figure 8:
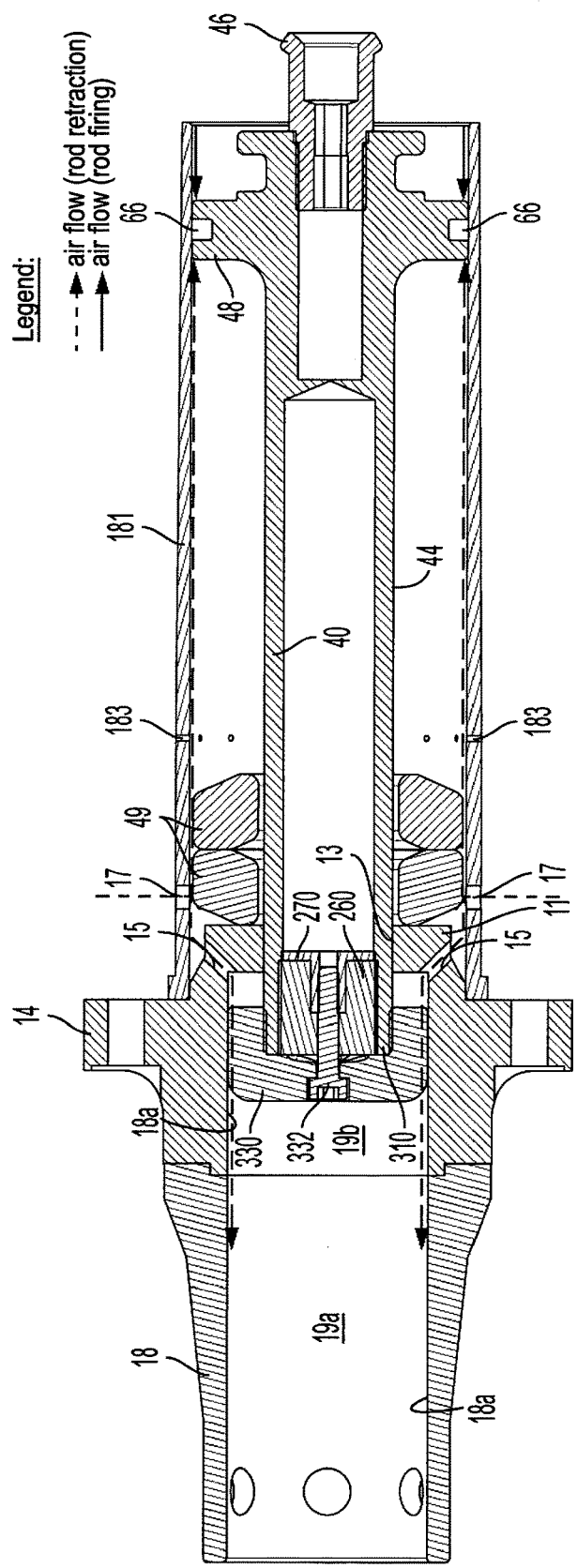
FIG. 8 is a side cross-sectional exaggerated view of the animal stunner rod, liner, nose, and head contact configuration with the rod in the fully retracted position.
Figure 12:
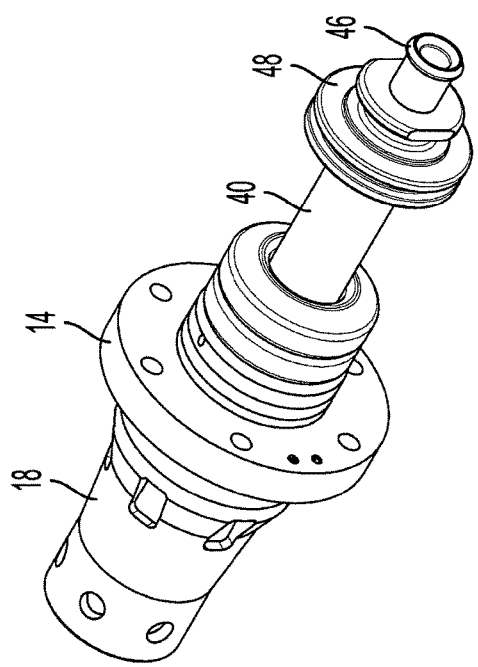
FIG. 12 is a rear perspective view of the stunning rod and stunner nose configuration of FIG. 11.

Stunner 10 may be operated by pressurized fluid, such as compressed air for the example shown. Outward of and shown as surrounding inner chamber 180 adjacent its central portion and rearward end is annular cylindrical first pressure or fire chamber 170. Compressed air can move freely and quickly between fire chamber 170 to the region of inner chamber 180 behind piston 48 upon operation of main valve 165. As shown in FIG. 4, annular cylindrical second pressure or return chamber 175 is also adjacent to, and shown as surrounding inner chamber 180 adjacent its central portion and forward end. A catch piston chamber 188 is located adjacent and around catch piston 50, which itself holds and releases catch 20. Chambers 170, 175, 180 and 188 may be pressurized to operate the stunner as shown in FIGS. 8-10.

A first or main trigger 146 in a main handle 136 is used to control a main handle valve 142 to the pressurized fluid, compressed air as used herein, to initiate the sequence that fires the stunning rod. In an embodiment, engaging main trigger 146 is sufficient to fire the stunning rod. An alternate embodiment of the stunner shown designed for increased safety purposes may further require the head contact activator 18 located at the front of the tool to be in contact with the animal to receive the stroke.

Main handle 136 assembly may be connected to the stunner housing 12 through a cushion mount assembly 220 (or alternate embodiments 220', 220") designed to reduce impact and wear on an operator of the stunner during use. In general, these embodiments of the cushion mount assembly are disposed between the main handle and main valve body. The first embodiment of cushion mount assembly 220 generally includes a first or upper portion 222 which is connected or otherwise secured to the lower side of main valve body 166, and a second or lower portion 226 connected or otherwise secured to the upper end of main handle 136. Fluid passageways 156, 158, 160 traverse through the cushion mount assembly, and a pair of anti-shock members 230a, 230b are disposed between the upper portion 222 and lower portion 226.

The second embodiment of cushion mount assembly 220' generally includes upper portion 222 connected to the lower side of main valve body 166, and lower portion 226 connected to main handle 136. A central pin 236 is disposed between the upper and lower portions 222, 226 along a central axis to secure the upper and lower portions together, with passages 156c, 158c, 160c disposed along the pin 236 to connect to fluid passageways 156, 158, 160 that traverse through the assembly 220'. Anti-shock members 230a', 230b' are disposed between the upper and lower portions 222, 226 and may be configured in a variety of shapes to allow for different angled connections between the main handle 136 and stunner housing 12.

The third embodiment of cushion mount assembly 220" generally includes a singular anti-shock member 230" disposed between the mount upper portion 222 and mount lower portion 226. This singular anti-shock member 230" includes two cushions 230a, 230b joined by a shared central portion containing passageways 156c', 158c', 160c' formed therein for forming complete passageways 156, 158, 160 through the mount assembly 220".

The structure and functionality of such cushion mount embodiments 220, 220', 220" as generally described above are further described in U.S. Pat. No. 9,854,816 titled "CUSHION MOUNT FOR STUNNER" and assigned to Jarvis Products Corporation, the disclosure of which is hereby incorporated by reference.

In another embodiment, the construction and operation of the stunner of the present invention includes an additional auxiliary handle having a second trigger that must be simultaneously engaged with the first trigger for the stunning rod to be fired.

Figure 37:
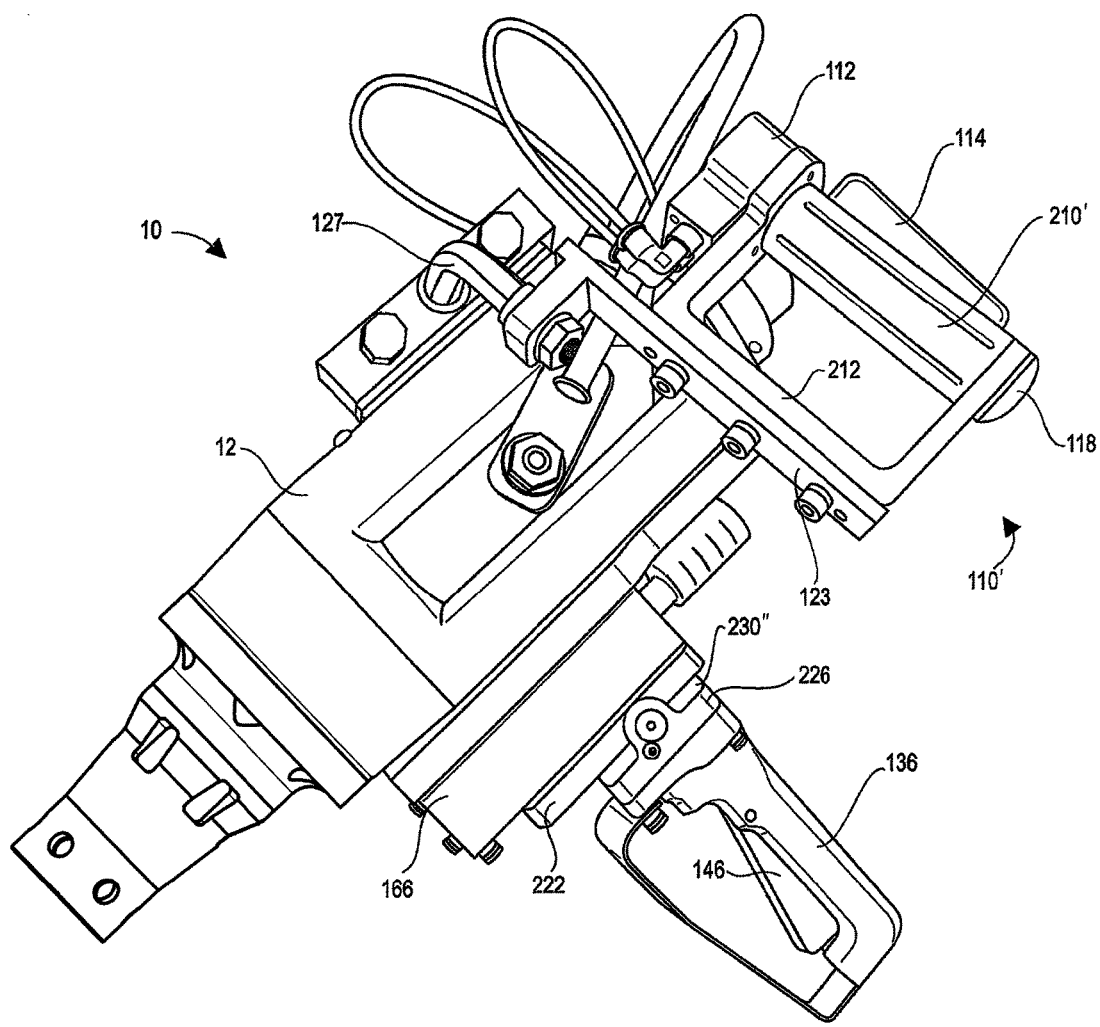
FIG. 37 is a side perspective view of the animal stunner of FIG. 4 employing an embodiment of a cushion mount assembly and auxiliary handle mount.

Auxiliary handle 110 and trigger 114 may be connected directly to the rear of the stunner housing, or alternatively through a mounting bracket 127 disposed on the top of the stunner housing which then holds the auxiliary handle 110 off to the side (see FIG. 37 as an example). An alternate embodiment of auxiliary handle 110' is generally designed with a rotational handle 210' and trigger 114 configuration, and a cushion 124 disposed on the mounting bracket 123 meant to absorb shock during an operator's use of the stunner.

The structure and functionality of such auxiliary handles 110, 110' and trigger 114 configuration as described above is further described in U.S. Pat. No. 9,854,816 titled "CUSHION MOUNT FOR STUNNER" and assigned to Jarvis Products Corporation, the disclosure of which is hereby incorporated by reference.

In a further embodiment, a combination of at least two (between a first trigger, second trigger, and head contact activator), and preferably all three, are employed to achieve maximum safety.

The structure and operation of catch 20 with respect to the stunning rod is shown in more detail in FIG. 4. The stunning rod 40 comprises an elongated body 44 having a longitudinal axis 42. A stunning rod lip 46 is disposed on one end of the stunning rod 40. The stunning rod 40 is axially disposed on piston 48 within the housing 12 and is capable of being driven forward along the longitudinal axis 42 towards the front end of the housing 12 when pressurized air or other pneumatic fluid enters the chamber, as described above. The stunning rod 40 is shown with the forward end 310 and strike end 330 sized for striking (e.g. concussing) the animal's head, but other stunning rod designs and styles may be employed, including those with sufficiently similar diameter(s) of the strike end to prevent penetration of the animal being stunned.

Other embodiments of the catch 20 arrangement may also be used. For example, the catch 20 may comprise a plurality of arcuate sections substantially forming a cylinder shape, with each arcuate section being pivotable from a closed position to an open position to hold and release the stunning rod 40 by the stunning rod lip 46. As another example, the catch 20 may be formed by four quarter-cylinder shaped portions that act in a manner similar to the catch 20 configuration described herein. This and other embodiments of the catch 20 that may be employed with the concussion stunner of the present invention described herein are described in more detail in U.S. Pat. No. 9,687,003 titled "STUNNER" and assigned to Jarvis Products Corporation, the disclosure of which is hereby incorporated by reference.

FIG. 4 shows the animal stunner 10 with the catch 20 hold position (specifically the upper portion of catch 20 is in the correct hold position; the bottom portion is shown in the released position solely for purposes of demonstrating the rotational range of the catch—the catch does not actually operate in this manner), with valves in the neutral position, and with the air supply pressurized and prior to firing. A main valve body 166 is pressurized by the compressed fluid (such as, but not limited to, air, water, carbon dioxide, and the like). Main valve 165 within valve body 166 is positioned by spring (not shown) pressure and pressure force conveyed from passages 158 (which may be connected to a supply port) through the main handle valve 142. The main valve spool 165 in this position will simultaneously pressurize, via passageways 135, 162 and 164, the fire chamber 170 and also the smaller return chamber 175, both at a slower fill rate. The stunning rod piston 48 is fully pressurized by fluid flow from fire chamber 170 behind the piston, and retained from movement by the closed catch 20 assembly holding stunning rod lip 46. The main handle valve 142 is in the neutral position and not yet activated by main trigger 146, and valve 142 is extended by spring (not shown) pressure downward, so that the fluid passage to the head contact 18 may be vented through the main handle valve 142. The head contact 18 may be extended by spring (not shown) pressure forward. Any fluid pressure on the extend side of the catch piston 50 in chamber 188 is vented. The area under and behind the stunning rod piston 48 is vented through the main valve body 166. The stunner will not fire in this position, wherein main trigger 146, optional auxiliary trigger (not shown) and head contact 18 are not depressed.

To commence the firing sequence in an embodiment of the present invention, the main handle valve 142 is activated by the operator depressing main trigger 146 with one hand. The optional auxiliary handle and trigger (not shown) may also be activated by the operator depressing the auxiliary trigger with their other hand. As the main handle valve moves into the upward position, air passage from the main handle valve 142 to main valve spool (spring end) is exhausted via passageway. Compressed air also flows to the catch piston cylinder chamber 188. As a result of main trigger 146 being depressed (and if being employed, auxiliary handle valve being pressurized), catch piston 50 is moved by the compressed air in chamber 188 and extends forward to its limit and opens the catches 20. As a result, stunning rod 40 is released and moves forward at a high rate of speed, while the fluid in chamber 180 under and forward of the stunning rod piston 48 is exhausted. Another embodiment of the present invention includes head contact 18 being activated by the operator pressing it against the animal's head to move the contact rearward. The stunning rod 40 is fired after the head contact is activated and the main trigger 146 is depressed.

In an alternate embodiment discussed below, the head contact 18 is fixed, and for safety purposes both the main trigger 146 and auxiliary trigger (not shown) must be depressed to fire the stunning rod 40.

In the embodiment shown in FIGS. 8-10, the stunner 10 has a head contact 18 with a sleeve 19*a* in axial alignment with a sleeve 19*b* of nose 14. The inner diameters of the opening 18*a* extending through head contact 18 and nose 14 sleeves 19*a*, 19*b* are the same, and are sized for receiving a strike end 330 of the stunning rod 40 in a sliding fit. The nose contact is fixed and does not move with respect to the rest of the stunner 10.

Full operation of the stunner is exemplified in FIGS. 8-10, depicting the stunning rod in its retracted, partially extended, and fully extended positions, respectively. Specifically, the firing sequence of the stunner is depicted in the numerical order of FIGS. 8-10, and the rod retraction sequence is depicted in the reverse numerical order of FIGS. 8-10. The flow of pressurized air used for the firing sequence, and for cleaning and retracting purposes during the rod retraction sequence, is demonstrated via the dashed arrows in FIGS. 8-10. In FIG. 8, stunning rod 40 is fully retracted within a lining 181 that forms the shell of fire chamber 180. In this position, the stunning rod lip 46 extends past the liner to engage the catch 20 (as shown in FIG. 4). The stunning rod 40 has a forward end 310 which extends past the liner 181 through a bore 13 in the nose 14, such bore 13 having a diameter slightly larger than the diameter of the stunning rod 40. The inner diameters of nose 14 forward of the bore 13 and head contact 18 are the same as or slightly larger than that of the strike end 330 attached to the forward end 310 of the stunning rod 40, to receive the strike end in a sliding fit. Annular cushions 49 are disposed on the opposite side of the bore 13 in nose 14 within the liner, and are meant to absorb the impact of the piston 48 once the stunning rod reaches its end of stroke position. These annular cushions 49 prevent damage to the interior components of the stunner housing during operation.

FIG. 9 depicts the stunning rod in a mid-stroke position, just after firing (i.e. releasing the stunning rod lip 46 from the catch 20 by depressing at least main trigger 146). In this position, stunning rod 40 has begun to travel forward along longitudinal axis 42 towards the front end of the stunner (i.e. towards nose 14 and head contact 18) due to the pressures exerted on the rearward-facing end of piston 48 from fluid (preferably air) buildup. At this point, strike end 330 and forward end 310 of the stunning rod have moved past the nose 14 and have begun to enter head contact 18 within sleeve 19*a*. Head contact 18 sleeve 19*a* has an inner diameter slightly larger than that of the strike end 330, and substantially larger than that of the stunning rod forward end 310.

FIG. 10 depicts the stunning rod 40 in its end of stroke position. Here, the piston 48 has finally made contact with annular cushions 49 as stunning rod 40 travels along longitudinal axis 42, the cushions which absorb the impact of the piston and prevent the stunning rod 40 from further movement forward. In this end of stroke position, the strike end 330 has moved past the outside of head contact 18—just far enough to make contact with (and concuss) an animal, but not so far that the entirety of strike end 330 protrudes out of head contact 18. This is meant to aid in returning rod 40 to its retracted position, as the conforming inner diameter of head contact 18 to strike end 330 keeps stunning rod 40 substantially parallel to longitudinal axis 42 and thus promotes smooth rod travel between retracted and end of stroke positions (FIGS. 8 and 10 respectively).

Once the stunning rod reaches a full forward, end of stroke position, the stroke is stopped by the annular cushions 49 next to and inside of the nose housing 14. In this position the stunning rod piston O-ring seal 66 is disposed adjacent to the small holes 183 in the liner 181 of chamber 180 allowing air flow into the main valve body 166 to the bottom end of the main valve spool 165 (FIGS. 4 and 10). As main valve 165 is pressurized, the spool commences moving upward against the pressure of the spring to reverse the flow of air to the stunning rod piston 48.

Near the end of the firing sequence, the air in main valve 165 moves into the reverse position to retract the stunning rod, as a result of compressed air flow. Main handle valve 142 may still be depressed and activated. Head contact 18 is released from the animal's head so that contact valve 18 returns to the forward position in the embodiments of the present invention using such interactive head contact. Main valve 165 is pressurized forcing the main valve spool to move upward against the pressure of the spring, so that the main valve body air flow is reversed. As this occurs, fire air chamber 170 is exhausted through the main valve body 166, and air flow is reversed from the catch piston 50 chamber 188, out through the head contact 18. The compressed air pressure immediately available from the return chamber 175 causes pressurized air to move freely and quickly to flow via passageways 162, main valve 165 and exhaust passageway (not shown) into the forward end of chamber 180. Although return chamber 175 is volumetrically smaller and contains less pressurized fluid than fire chamber 170, it is sized to provide sufficient air to drive piston 48 and stunning rod 40 rearward. This use of compressed air from adjacent return chamber 175 reduces the volume of air needed as compared to prior art methods where the air to return the piston is supplied via internal passageways from the supply port. Instead of relying on a short, higher pressure blast of compressed air through the supply port at the same time the piston return cycle is initiated, the present invention pre-supplies the compressed piston return air at the same time the fire chamber is pressurized, during the longer time available between operation cycles. This permits restriction orifices of desired sizes to be used at the supply port, thereby saving on total fluid volume usage by the stunner.

The pressurized air in chamber 180 forward end retracts the stunning rod 40 rearward until piston 48 contacts the forward end 51 of catch piston 50. As a result of the piston striking it, the catch piston 50 is retracted rearward into the catch cylinder 188, which closes the catches 20 by forcing them inward to capture stunning rod lip 46, so that the stunning rod 40 is retained by the catches.

When the main handle valve 142 is returned to neutral as a result of main trigger 146 being released and in the undepressed position, air passage to main valve spool (spring end) is again pressurized, and shifts valve 165 to its original position. Both fire chamber 170 and return chamber 175 are again pressurized, and any pressure is vented through other vents dispersed throughout the stunning rod housing 12, so that air passage to the catch piston 50 is vented two ways for safety, and will not fire again until the firing sequence is again started. If the optional auxiliary handle is included with the present invention, then such pressures may further be vented through the auxiliary handle (not shown). The order of firing sequence makes no effect on the performance, and main trigger 146 and the head contact 18 (and optionally, second trigger on an auxiliary handle) must all be activated in any order before firing will occur in this embodiment.

Figure 14:
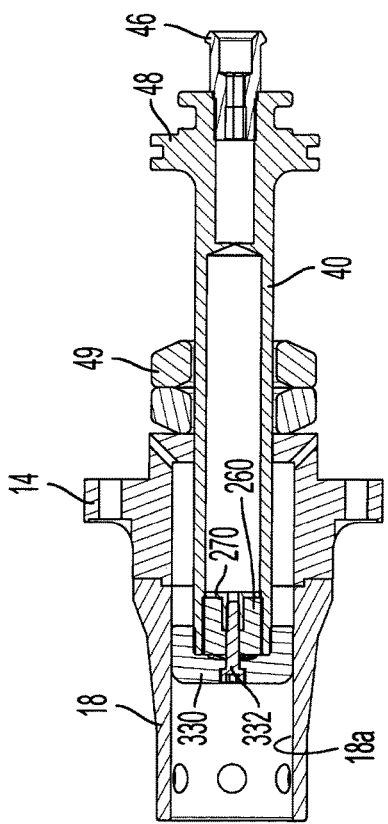
FIG. 14 is a side cross-sectional view of the stunning rod and stunner nose along lines 14-14 of FIG. 13.
Figure 11:
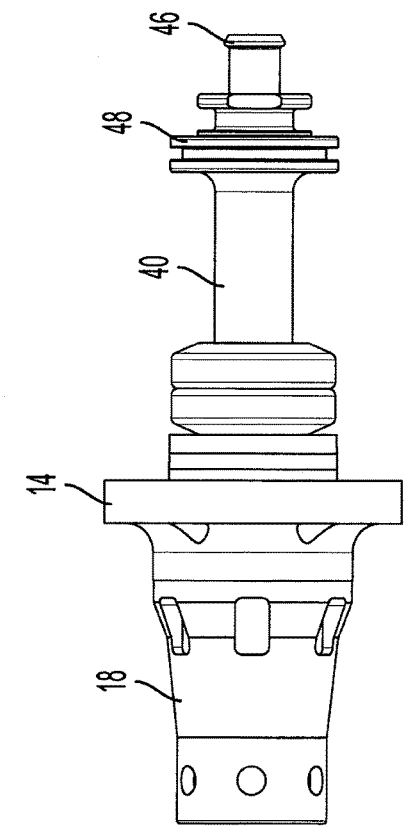
FIG. 11 is a side view of the stunning rod and stunner nose configuration of the stunner of FIG. 4 of the present invention.
Figure 13:
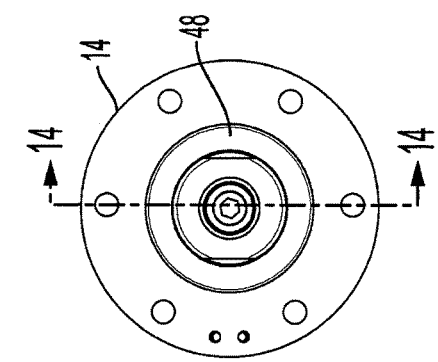
FIG. 13 is a frontal view of the stunning rod and stunner nose of FIG. 11.
Figure 15:
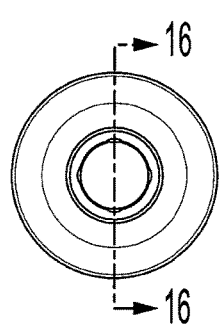
FIG. 15 is a frontal view of the stunning rod of the present invention without the strike end or outwardly extending lip attached.
Figure 16:
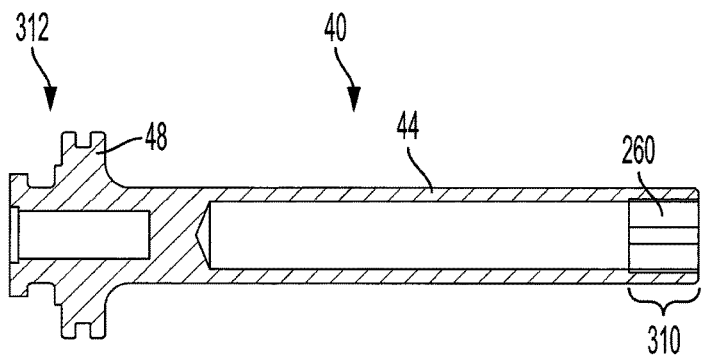
FIG. 16 is a side cross-sectional view of the stunning rod along lines 16-16 of FIG. 15.

An embodiment of a stunning rod 40 useful in the stunner of the present invention is shown in FIGS. 15-18. The stunning rod 40 has an elongated body 44 extending along a longitudinal axis 42 (FIG. 18), with the elongated body 44 having a forward end 310 and an opposite rearward end 312. Body 44 may be solid for all or a portion of its length or may be hollow for all or a portion of its length (FIG. 16). The forward end 310 is hollow and extends out from the elongated body 44 parallel to the longitudinal axis 42. The forward end 310 may be sized with the same diameter(s) as the stunning rod body for striking (e.g. concussing) an animal's head. An alternate embodiment is shown in FIGS. 8-10. In this embodiment, the rod forward end 310 may be sized or may have an attachable strike end 330 that has a sufficiently larger diameter than the stunning rod body to prevent penetration of the animal to be stunned. Unlike the prior art concussion stunner shown in FIG. 3, where the stunning rod body and the impact or strike end have essentially the same diameter, in the present invention the diameter of the stunning rod body is significantly smaller that the diameter of the strike end 330, such that there is an annular gap between the stunning rod elongated body 44 and the inner wall of opening 18a through the sleeves 19a, 19b of the nose and head contact. Such strike end 330 may be attached to the forward end 310 of the stunning rod 40 by a threaded connection of fastener 332, as shown in FIGS. 14 and 19, which allows for easy removal of the stunning rod 40 from the stunner 10 and for easier replacement of the cushions 49. The opposite rearward end 312 of body 44 has formed in (or received as a separate piece as shown in FIG. 19) an outwardly extending lip 46 for engagement with the catch 20.

Figures 17, 17A:
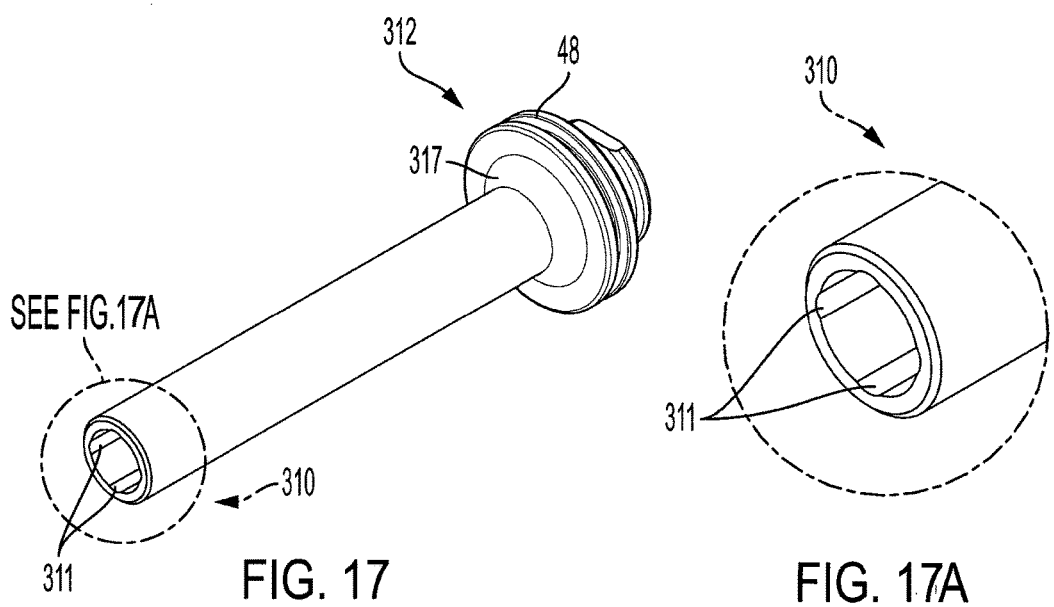
FIG. 17 is a front perspective view of the stunning rod of FIG. 15.
FIG. 17a is an enlarged front perspective view of the forward end of the stunning rod of FIG. 17.
Figure 31:
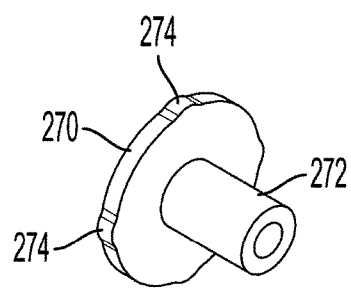
FIG. 31 is a front perspective view of the locking element of the stunning rod configuration of the present invention.
Figure 32:
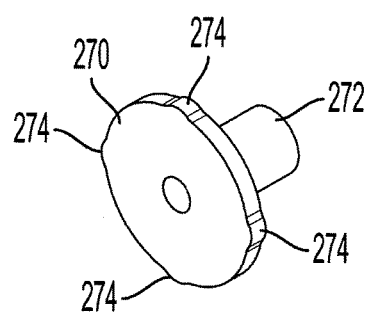
FIG. 32 is a rear perspective view of the locking element of FIG. 31.

To properly attach strike end 330, an annular, cylindrical locking insert 260 (which may be composed of a resilient material such as rubber or the like) and locking element or cap 270 (which may be composed of aluminum and the like) are inserted into the open forward end 310 of stunning rod 40. Locking insert 260 has a longitudinal axis substantially parallel to the elongated body longitudinal axis and may have in its undeformed state an outer diameter approximately equal to or greater than the inner diameter of the rod hollow forward end 310, and will geometrically conform to the inside of forward end 310 due to its resilient nature once it is inserted and placed under compression. Locking insert 260 has a bore 262 extending through the central axis of the locking insert 260 (FIGS. 28-30), which bore has a larger diameter 261 at the rearward end, opposite strike end 330. Such insert bore 261 is sized in diameter and length to receive a projection 272 extending from the central axis of the planar face of locking element 270 (FIGS. 31-32) shown as having a disk shape normal to the central axis. The locking element 270 is inserted into locking insert 260 so that projection 272 is encased by locking insert 260 (FIG. 19). The locking insert and locking element subassembly is then inserted into the forward end 310 of stunning rod 40. Within forward end 310 are a plurality of spaced longitudinally extending parallel locking grooves 311 (FIGS. 17 and 17A) for slidingly receiving correspondingly configured spaced locking flanges or lobes 274, which extend radially and are disposed around the periphery of locking element 270 (FIGS. 17 and 31-32). The number of locking grooves 311 are equal to the number of locking flanges 274, and extend around the circumference of the hollowed inside of forward end 310. The locking grooves 311 match with their respective locking flanges 274 upon inserting the locking insert 260 and locking element 270 subassembly into the forward end 310, and extend from end 310 a distance at least equal to the length of the subassembly. This configuration prevents strike end 330 from rotating within the forward end 310 of stunning rod 40 during stunning operations. The arc length of each flange 274 and respective locking groove 311 may be variable in alternate embodiments of the present invention. A singular flange 274 may be used on the locking element 270 to be received by a corresponding singular groove 311, or multiple flanges 274 of variable arc lengths dispersed about the perimeter of the locking element 270 (and corresponding grooves 311) may also be used.

After the locking insert 260 and locking element 270 subassembly is inserted into the forward end 310, the strike end 330 is attached over the forward end 310 to share a common longitudinal axis, as shown in FIG. 19. Strike end 330 comprises a bore 331 extending through its center and aligning with locking insert bore 262 and a central opening in locking element projection 272 (FIGS. 23-27). The strike end 330 also comprises wrench grooves 336 spaced about its outer periphery for engagement with a spanner wrench to assist with tightening the strike end 330 onto forward end 310. A fastener such as a threaded screw or bolt 332 is inserted through the strike end bore 331, bore 262, and complimentarily threaded opening in locking element projection 272, respectively, and tightened to ensure a tight connection. As the screw 332 is tightened, the resilient material that makes up locking insert 260 may also expand outwardly in all directions to fill the remaining open space in the locking grooves 311 after insertion, which further assists in preventing such rotation. To still further prevent rotation of the strike end 330, radially extending anti-rotation grooves 334 (FIGS. 26 and 27) may be formed into the inside surface of strike end 330 which faces rearward, toward the forward end 310 of stunning rod 40, opposite the portion of strike end 330 meant for contacting the animal (adjacent locking insert 260 after installation). In the alternative, radially extending projections may be provided on the inside surface of strike end 330, leaving grooves therebetween. Pressures exerted onto locking insert 260 via the screw 332 pushing down on strike end 330 results in the resilient material of insert 260 expanding into anti-rotation grooves 334, which further prevents strike end 330 from rotating off of the stunning rod 40 forward end 310 during use.

Figure 18:
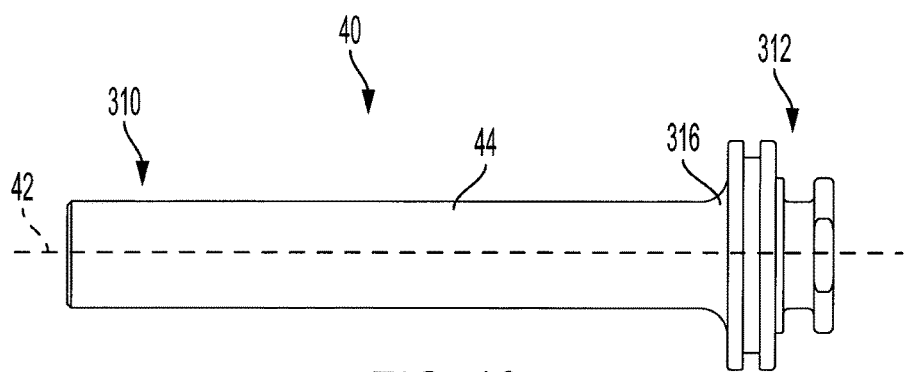
FIG. 18 is a side view of the stunning rod of FIG. 15.
Figure 19:
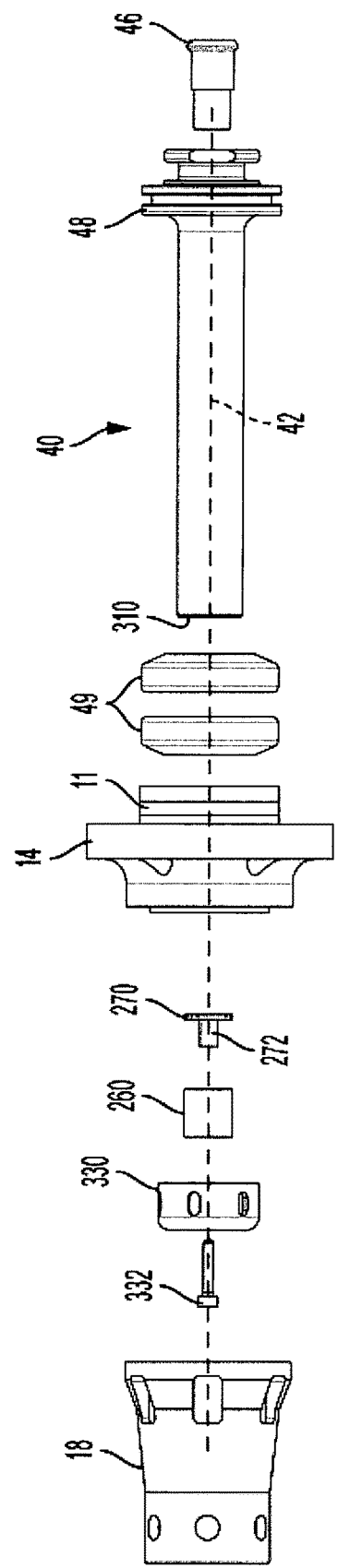
FIG. 19 is a side exploded view of the stunning rod and stunner nose configuration of the stunner of FIG. 4 of the present invention.

As shown in FIGS. 17-18, the stunning rod 40 also has a mounting portion 316 adjacent to the elongated body 44 and located between the forward end 310 and rearward end 312. The mounting portion 316 may have a circular profile for receiving the piston 48. The mounting portion 316 has a radially outwardly extending flange 317 which is perpendicular to the elongated body 44, as shown in FIG. 17. Referring to FIG. 17, the piston 48 has a cylindrical body with the front and rear surfaces both being flat. The piston 48 may have a circular inner bore for slideably receiving the stunning rod 40. In particular, the size of the inner bore conforms to the radial measurements of the mounting portion 316, which is also circular in shape. The piston 48 is axially received and rests on mounting portion 316 in a tight sliding fit against flange 317.

Alternatively, piston 48 may be integrally formed with rod 40 of one piece, as shown in FIG. 16. The elongated body 44 has a circular profile adjacent to the piston 48 portion of the stunning rod 40. On the forward end 310 facing side of the piston 48, the elongated body 44 flanges out in a semicircular manner where the forward-facing surface of the piston 48 and elongated body 44 integrally meet. The rearward end 312 adjacent piston 48 may receive or have integrally formed therein of one piece a lip 46 (FIG. 19) for engaging the catch 20.

Figure 20:
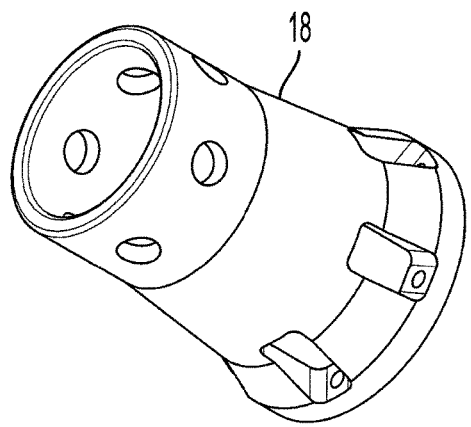
FIG. 20 is a front perspective view of the head contact/nose guide of the present invention.
Figure 21:
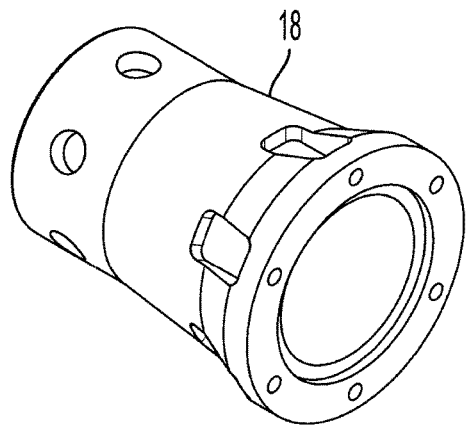
FIG. 21 is a rear perspective view of the head contact/nose guide of FIG. 20.
Figure 22:
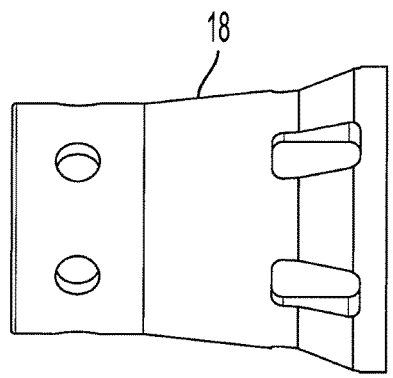
FIG. 22 is a side view of the head contact/nose guide of FIG. 20.
Figure 23:
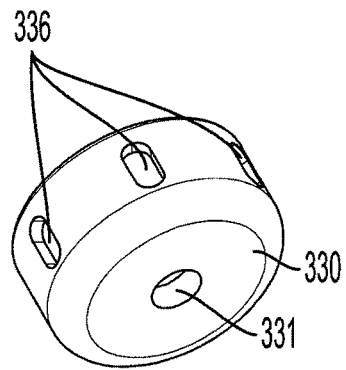
FIG. 23 is a front perspective view of the strike end of the stunning rod of the stunner of the present invention.
Figure 24:
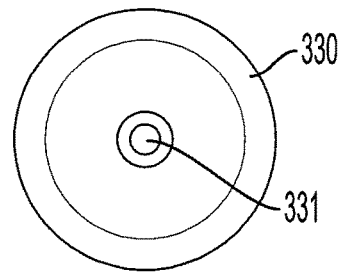
FIG. 24 is a frontal view of the strike end of FIG. 23.
Figure 25:
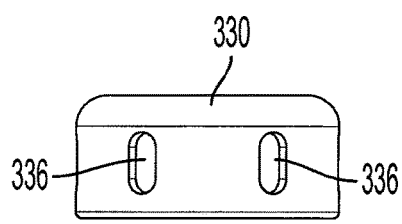
FIG. 25 is a side view of the strike end of FIG. 23.
Figure 26:
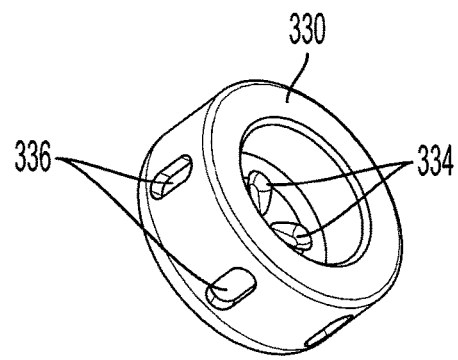
FIG. 26 is a rear perspective view of the strike end of FIG. 23.
Figure 27:
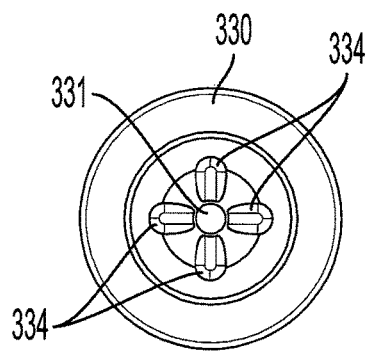
FIG. 27 is a rear view of the strike end of FIG. 23.
Figure 28:
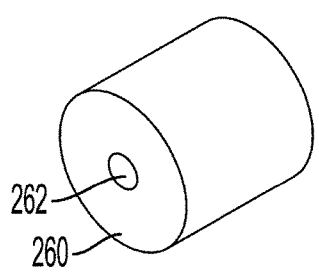
FIG. 28 is a perspective view of the locking insert of the stunning rod configuration of the present invention.
Figure 29:
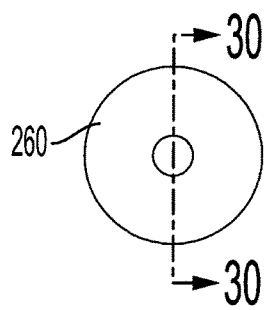
FIG. 29 is a frontal view of the locking insert of FIG. 28.
Figure 30:
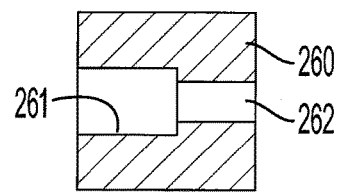
FIG. 30 is a side cross-sectional view of the locking insert along lines 30-30 of FIG. 29.

Referring to FIGS. 11-14, an outer housing nose 14 surrounds the stunning rod 40 and includes a head contact/nose guide 18 with an opening 18a through which the stunning rod passes (FIGS. 20-22). The inner diameter of the bore in the opening 18a is slightly larger than and conforms to the outer diameter of the stunning rod 40 strike end 330 so as to permit sliding movement of the rod in the longitudinal direction along longitudinal axis 42. As shown in FIGS. 8-10, outer housing nose 14 has one or more debris holes or openings 15 disposed in and spaced around a collar 11 of outer housing nose 14 bore 13, such collar 11 being in direct contact with liner 181 (FIGS. 8-10 and 33-36). Holes 15 internally connect the inner chamber 180 between liner 181 and stunning rod body 44, forward of cushions 49, and the chamber formed between opening 18a of sleeves 19a, 19b and stunning rod body 44, forward of bore 13 of collar 11. Referring to FIGS. 8-10, there exists the potential for debris to build up within the head contact 18 and nose 14 after the rod 40 reaches its forward end of stroke position (FIG. 10). As the rod 40 travels back to its retracted position (depicted in the reverse order of FIGS. 8-10) due to incoming air pressure from the return chamber (not shown) through liner hole 17 building up in front of piston 48, additional air flows through nose holes 15 around striking end 330 and out through the front of head contact/nose guide 18. This debris-clearing air pressure traversing through holes 15 continues to flow as long as the operator keeps the main trigger 146 depressed. These holes 15 allow for such air pressure inside the nose contact 18 and nose 14 to assist in clearing out debris that may otherwise collect inside the nose 14 during operation of the stunner 10.

The present invention therefore provides an improved concussion stunner rod and nose for an animal stunner having one or more of the following advantages: 1) a stunning rod and stunner housing nose configuration that allows for clearance of debris building up inside the stunner housing; and 2) a locking insert and locking element subassembly disposed in the front end of the stunning rod for a more secure attachment of the strike end, such subassembly being designed to prevent rotation of the strike end during operation of the stunner.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A stunning rod adapted for use in a pneumatic animal stunner for stunning an animal, the rod being mountable with a piston movable within an inner chamber in the stunner, the inner chamber having a catch for alternately holding and releasing the stunning rod, the rod comprising:
   an elongated body having a longitudinal axis and a diameter, the elongated body having a forward end and an opposite rearward end, the forward end having an opening therein adapted to receive a locking insert, and the opposite rearward end adapted to engage a catch;
   a strike end having a diameter larger than the elongated body diameter, the strike end adapted for striking an animal's head; and
   a locking insert secured to the strike end and disposed in the elongated body forward end opening, the locking insert having a longitudinal axis substantially parallel to the elongated body longitudinal axis, the locking insert conforming to the inside of the elongated body forward end opening,
   wherein the stunning rod is capable of being driven forward along a longitudinal axis within the stunner inner chamber to stun an animal, and rearward along the longitudinal axis to retract and hold the stunning rod by the catch.

2. The stunning rod of claim 1 further including a locking element and central projection extending therefrom, and wherein the locking insert has a bore at an end opposite the strike end for receiving the central projection of the locking element.

3. The stunning rod of claim 2 wherein the locking element has at least one lobe disposed about its periphery and wherein the elongated body forward end opening includes at least one groove for receiving the at least one lobe of the locking element.

4. The stunning rod of claim 2 wherein the locking element central projection further comprises an outer diameter corresponding to an inner diameter of the locking insert bore.

5. The stunning rod of claim 4 wherein the strike end further comprises a bore for receiving a fastener for securing the strike end to the locking element, the fastener extending through the strike end, locking insert, and locking element.

6. The stunning rod of claim 1 wherein the locking insert is resilient and is under compression as secured to the strike end and inserted into the elongated body forward end opening.

7. The stunning rod of claim 6 wherein the strike end further includes at least one groove or projection, and when secured, the compressed locking insert is expanded outwardly into the strike end at least one groove or projection to secure the strike end in the elongated body forward end against rotation.

8. A pneumatic animal stunner for stunning an animal, the stunner comprising:
 a housing;
 an inner chamber in the housing;
 a catch mounted within the housing for alternately holding and releasing a stunning rod; and
 a stunning rod moveable within the inner chamber in the stunner, the stunning rod comprising:
  an elongated body having a longitudinal axis and a diameter, the elongated body having a forward end and an opposite rearward end, the forward end having an opening therein adapted to receive a locking insert, and the opposite rearward end adapted to engage the catch;
  a strike end having a diameter larger than the elongated body diameter, the strike end adapted for striking an animal's head; and
  a locking insert secured to the strike end and disposed in the elongated body forward end opening, the locking insert having a longitudinal axis substantially parallel to the elongated body longitudinal axis, the locking insert conforming to the inside of the elongated body forward end opening,
 wherein the stunning rod is capable of being driven forward along a longitudinal axis within the stunner inner chamber to stun an animal, and rearward along the longitudinal axis to retract and hold the stunning rod by the catch.

9. The stunning rod of claim 8 further including a locking element and central projection extending therefrom, and wherein the locking insert has a bore at an end opposite the strike end for receiving the central projection of the locking element.

10. The stunning rod of claim 9 wherein the locking element has at least one lobe disposed about its periphery and wherein the elongated body forward end opening includes at least one groove for receiving the at least one lobe of the locking element.

11. The stunning rod of claim 9 wherein the locking element central projection further comprises an outer diameter corresponding to an inner diameter of the locking insert bore.

12. The stunning rod of claim 11 wherein the strike end further comprises a bore for receiving a fastener for securing the strike end to the locking element, the fastener extending through the strike end, locking insert, and locking element.

13. The stunning rod of claim 8 wherein the locking insert is resilient and is under compression as secured to the strike end and inserted into the elongated body forward end opening.

14. The stunning rod of claim 13 wherein the strike end further includes at least one groove or projection, and when secured, the compressed locking insert is expanded outwardly into the strike end at least one groove or projection to secure the strike end in the elongated body forward end against rotation.

15. A stunning rod adapted for use in a pneumatic animal stunner for stunning an animal, the rod being mountable with a piston movable within an inner chamber in the stunner, the inner chamber having a catch for alternately holding and releasing the stunning rod, the rod comprising:
 an elongated body having a longitudinal axis and a diameter, the elongated body having a forward end and an opposite rearward end, the forward end having an opening therein and at least one groove disposed within an inner surface thereof, and the opposite rearward end adapted to engage a catch;
 a strike end having a diameter larger than the elongated body diameter, the strike end adapted for striking an animal's head;
 a locking element having a surface, the locking element surface having at least one lobe disposed about its periphery received in the at least one groove of the elongated body forward end opening; and
 a locking insert secured within the elongated body forward end opening by the locking element,
 wherein the stunning rod is capable of being driven forward along a longitudinal axis within the stunner inner chamber to stun an animal, and rearward along the longitudinal axis to retract and hold the stunning rod by the catch.

16. The stunning rod of claim 15 wherein the locking element surface extends in a direction normal to the elongated body longitudinal axis.

17. The stunning rod of claim 15 wherein the locking insert further comprises a bore and the locking element has a central projection with an outer diameter corresponding to an inner diameter of the locking insert bore.

18. The stunning rod of claim 17 wherein the strike end further comprises a bore for receiving a fastener for securing the strike end to the locking element, the fastener extending through the strike end, locking insert, and locking element central projection.

19. The stunning rod of claim 15 wherein the locking insert is resilient and as secured is under compression.

20. The stunning rod of claim 19 wherein the strike end further includes at least one groove or projection, and when secured, the compressed locking insert is expanded outwardly into the strike end at least one groove or projection to secure the strike end in the elongated body forward end against rotation.

21. The stunning rod of claim 15 wherein the locking insert conforms to the inside of the elongated body forward end opening.

22. A pneumatic animal stunner for stunning an animal, the stunner comprising:
 a housing;
 an inner chamber in the housing;
 a catch mounted within the housing for alternately holding and releasing a stunning rod; and
 a stunning rod moveable within the inner chamber in the stunner, the stunning rod comprising:
  an elongated body having a longitudinal axis and a diameter, the elongated body having a forward end and an opposite rearward end, the forward end having an opening therein and at least one groove disposed within an inner surface thereof, and the opposite rearward end adapted to engage the catch;
  a strike end having a diameter larger than the elongated body diameter, the strike end adapted for striking an animal's head;
  a locking element having a surface, the locking element surface having at least one lobe disposed about its periphery received in the at least one groove of the elongated body forward end opening; and
  a locking insert secured within the elongated body forward end opening by the locking element,
 wherein the stunning rod is capable of being driven forward along a longitudinal axis within the stunner inner chamber to stun an animal, and rearward along the longitudinal axis to retract and hold the stunning rod by the catch.

23. The stunning rod of claim 22 wherein the locking element surface extends in a direction normal to the elongated body longitudinal axis.

24. The stunning rod of claim 22 wherein the locking insert further comprises a bore and the locking element has a central projection with an outer diameter corresponding to an inner diameter of the locking insert bore.

25. The stunning rod of claim 24 wherein the strike end further comprises a bore for receiving a fastener for securing the strike end to the locking element, the fastener extending through the strike end, locking insert, and locking element central projection.

26. The stunning rod of claim 23 wherein the locking insert is resilient and as secured is under compression.

27. The stunning rod of claim 26 wherein the strike end further includes at least one groove or projection, and when secured, the compressed locking insert is expanded outwardly into the strike end at least one groove or projection to secure the strike end in the elongated body forward end against rotation.

28. The stunning rod of claim 22 wherein the locking insert conforms to the inside of the elongated body forward end opening.

29. A stunning rod adapted for use in a pneumatic animal stunner for stunning an animal, the rod being mountable with a piston movable within an inner chamber in the stunner, the inner chamber having a catch for alternately holding and releasing the stunning rod, the rod comprising:
    an elongated body having a longitudinal axis and a diameter, the elongated body having a forward end and an opposite rearward end, the forward end having an opening adapted to receive a locking insert, and the opposite rearward end adapted to engage a catch;
    a strike end having a diameter larger than the elongated body diameter, the strike end having a first surface adapted for striking an animal's head and a second surface having at least one groove or projection opposite the first surface; and
    a locking insert secured to the strike end second surface and secured within the elongated body forward end opening, the locking insert conforming to the inside of the elongated body forward end opening and the strike end at least one groove or projection,
    wherein the stunning rod is capable of being driven forward along a longitudinal axis within the stunner inner chamber to stun an animal, and rearward along the longitudinal axis to retract and hold the stunning rod by the catch.

30. The stunning rod of claim 29 wherein the locking insert is resilient and is under compression as secured to the strike end and inserted into the elongated body forward end opening.

31. The stunning rod of claim 29 further including a locking element and central projection extending therefrom, and wherein the locking insert has a bore at an end opposite the strike end for receiving the central projection of the locking element.

32. The stunning rod of claim 31 wherein the locking element has at least one lobe disposed about its periphery and wherein the elongated body forward end opening includes at least one groove for receiving the at least one lobe of the locking element.

33. The stunning rod of claim 31 wherein the locking element central projection further comprises an outer diameter corresponding to an inner diameter of the locking insert bore.

34. The stunning rod of claim 33 wherein the strike end further comprises a bore for receiving a fastener for securing the strike end to the locking element, the fastener extending through the strike end, locking insert, and locking element.

35. The stunning rod of claim 30 wherein as secured, the compressed locking insert is expanded outwardly into the strike end at least one groove or projection to secure the strike end in the elongated body forward end against rotation.

36. A pneumatic animal stunner for stunning an animal, the stunner comprising:
    a housing;
    an inner chamber in the housing;
    a catch mounted within the housing for alternately holding and releasing a stunning rod; and
    a stunning rod movable within the inner chamber in the stunner, the stunning rod comprising:
        an elongated body having a longitudinal axis and a diameter, the elongated body having a forward end and an opposite rearward end, the forward end having an opening adapted to receive a locking insert, and the opposite rearward end adapted to engage a catch;
        a strike end having a diameter larger than the elongated body diameter, the strike end having a first surface adapted for striking an animal's head and a second surface having at least one groove or projections opposite the first surface; and
        a locking insert secured to the strike end second surface and secured within the elongated body forward end opening, the locking insert conforming to the inside of the elongated body forward end opening and the strike end at least one groove or projection,
    wherein the stunning rod is capable of being driven forward along a longitudinal axis within the stunner inner chamber to stun an animal, and rearward along the longitudinal axis to retract and hold the stunning rod by the catch.

37. The stunning rod of claim 36 wherein the locking insert is resilient and is under compression as secured to the strike end and inserted into the elongated body forward end opening.

38. The stunning rod of claim 36 further including a locking element and central projection extending therefrom, and wherein the locking insert has a bore at an end opposite the strike end for receiving the central projection of the locking element.

39. The stunning rod of claim 38 wherein the locking element has at least one lobe disposed about its periphery and wherein the elongated body forward end opening includes at least one groove for receiving the at least one lobe of the locking element.

40. The stunning rod of claim 38 wherein the locking element central projection further comprises an outer diameter corresponding to an inner diameter of the locking insert bore.

41. The stunning rod of claim 40 wherein the strike end further comprises a bore for receiving a fastener for securing the strike end to the locking element, the fastener extending through the strike end, locking insert, and locking element.

42. The stunning rod of claim 37 wherein as secured, the compressed locking insert is expanded outwardly into the strike end at least one groove or projection to secure the strike end in the elongated body forward end against rotation.

43. A pneumatic animal stunner for stunning an animal, the stunner comprising:

a housing;

an inner chamber in the housing;

a catch mounted within the housing for alternately holding and releasing a stunning rod; and a stunning rod movable within the inner chamber in the stunner, the stunning rod comprising:

an elongated body having a longitudinal axis and an outer diameter, the elongated body having a forward end and an opposite rearward end, the opposite rearward end adapted to engage a catch; and a strike end secured to the elongated body forward end having an outer diameter larger than the elongated body diameter and grooves, the strike end adapted for striking an animal's head; and a nose, including a head contact at a forward end of the housing, the nose and head contact having a sleeve with an opening having an inner diameter for receiving the strike end in a sliding fit, wherein the stunning rod is capable of being driven forward along a longitudinal axis within the stunner inner chamber to stun an animal with the strike end, and rearward along the longitudinal axis to retract and hold the stunning rod by the catch; and wherein when the stunning rod strike end is fully driven forward past the head contact there is an annular gap between the stunning rod elongated body and the sleeve of the nose and head contact.

44. The stunner of claim 43 wherein the nose has at least one opening rearward of the head contact for the passage of fluid as the strike end slides in the sleeve back to the retracted position.

45. The stunner of claim 44 further including a liner disposed within the inner chamber in the housing and surrounding the stunning rod, the liner having at least one liner hole rearward of the nose for the passage of fluid entering through the liner hole and further flowing through the at least one opening of the nose as the strike end slides in the sleeve back to the retracted position.

46. A method of assembling a stunning rod for use in a pneumatic animal stunner for stunning an animal, comprising:

providing a stunning rod with an elongated body having a longitudinal axis and a diameter, the elongated body having a forward end and an opposite rearward end, the forward end having an opening therein, and the opposite rearward end adapted to engage a catch;

providing a strike end having a diameter larger than the elongated body diameter, the strike end having a first surface adapted for striking an animal's head and a second surface having at least one groove or projection opposite the first surface;

providing a locking insert having a longitudinal axis substantially parallel to the elongated body longitudinal axis and a bore disposed along said longitudinal axis;

inserting the locking insert into the elongated body forward end; and mounting the strike end to the stunning rod elongated body forward end by securing the strike end to the locking insert and conforming the locking insert to the inside of the elongated body forward end.

47. The method of claim 46 further including:

providing a bore disposed along a central axis of the strike end; and inserting a fastener through the bores of the strike end and locking insert to secure the strike end to the elongated body forward end.

48. The method of claim 46 further including compressing the locking insert upon inserting the locking insert into the elongated body forward end and securing the locking insert to the strike end.

49. The method of claim 48 further including:

expanding outwardly the compressed locking insert into the strike end at least one groove or projection, securing the strike end in the elongated body forward end against rotation.

50. The method of claim 48 further including:

providing in the stunning rod forward end opening at least one groove disposed within an inner surface thereof; and expanding outwardly the compressed locking insert into the at least one groove of the elongated body forward end opening.

51. The method of claim 46 further including:

providing in the stunning rod forward end opening at least one groove disposed within an inner surface thereof;

providing a locking element having a central projection with a bore and a surface, the locking element surface having at least one lobe disposed about its periphery for reception by the at least one groove of the elongated body forward end opening;

inserting the locking element central projection into the locking insert bore;

inserting the combined locking element and locking insert into the elongated body forward end, the at least one groove of the elongated body forward end opening receiving the at least one lobe of the locking element; and mounting the strike end to the stunning rod elongated body forward end.

52. A method of using a stunning rod in a pneumatic animal stunner for stunning an animal, the stunner having an inner chamber and a catch for alternately holding and releasing the stunning rod, comprising:

providing a stunner having a housing, an inner chamber, and a catch for alternately holding and releasing a stunning rod;

providing a stunning rod moveable within the inner chamber with an elongated body having a longitudinal axis and a diameter, the elongated body having a forward end and an opposite rearward end, the opposite rearward end adapted to engage the catch;

providing a strike end secured to the elongated body forward end having a diameter larger than the elongated body diameter, the strike end adapted for striking an animal's head;

providing on the stunner housing a nose, including a head contact at a forward end of the housing, the nose and head contact having a sleeve with an opening having an inner diameter for receiving the strike end in a sliding fit;

supplying a pressurized fluid to a rearward end of the inner chamber to move the piston forward;

driving the stunning rod forward along a longitudinal axis within the stunner inner chamber to stun an animal with the strike end, and rearward along the longitudinal axis to retract and hold the stunning rod by the catch, wherein when the stunning rod strike end is fully driven forward past the head contact, there is an annular gap between the stunning rod elongated body and the sleeve of the nose and head contact.

53. The method of claim 52 wherein the nose has at least one opening rearward of the head contact, and further including passing fluid through the at least one nose rearward opening as the strike end slides in the sleeve back to the retracted position.

54. The method of claim 53 further including providing a liner within the inner chamber in the housing and surrounding the stunning rod, the liner having at least one liner hole rearward of the nose, and further including passing fluid through the liner hole and further flowing the fluid through the at least one nose rearward opening as the strike end slides in the sleeve back to the retracted position.

* * * * *